(12) United States Patent
Park et al.

(10) Patent No.: US 12,356,327 B2
(45) Date of Patent: Jul. 8, 2025

(54) METHOD AND DEVICE FOR SAVING POWER FOR SIDELINK COMMUNICATION IN NR V2X

(71) Applicant: LG Electronics Inc., Seoul (KR)

(72) Inventors: Giwon Park, Seoul (KR); Seoyoung Back, Seoul (KR); Jongyoul Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 352 days.

(21) Appl. No.: 17/911,298

(22) PCT Filed: Mar. 12, 2021

(86) PCT No.: PCT/KR2021/003107
§ 371 (c)(1),
(2) Date: Sep. 13, 2022

(87) PCT Pub. No.: WO2021/182916
PCT Pub. Date: Sep. 16, 2021

(65) Prior Publication Data
US 2023/0115633 A1    Apr. 13, 2023

(30) Foreign Application Priority Data

Mar. 13, 2020  (KR) .................. 10-2020-0031221
Mar. 13, 2020  (KR) .................. 10-2020-0031366
May 14, 2020   (KR) .................. 10-2020-0057899
Oct. 27, 2020  (KR) .................. 10-2020-0140297
Feb. 18, 2021  (KR) .................. 10-2021-0022159

(51) Int. Cl.
H04W 72/25   (2023.01)
H04L 1/1607  (2023.01)
(Continued)

(52) U.S. Cl.
CPC ....... *H04W 52/0225* (2013.01); *H04L 1/1607* (2013.01); *H04L 1/1812* (2013.01);
(Continued)

(58) Field of Classification Search
None
See application file for complete search history.

(56) References Cited

U.S. PATENT DOCUMENTS

2020/0029340 A1   1/2020   He et al.
2020/0344722 A1*  10/2020  He .................. H04W 72/02
(Continued)

FOREIGN PATENT DOCUMENTS

WO     WO 2020033089       2/2020

OTHER PUBLICATIONS

ASUSTeK, "Discussion on sidelink physical layer procedure on NR V2X," 3GPP TSG RAN WG1 #99, R1-1912906, Reno, USA, Nov. 18-22, 2019, 10 pages.
(Continued)

*Primary Examiner* — Diane L Lo
(74) *Attorney, Agent, or Firm* — Fish & Richardson P.C.

(57) ABSTRACT

According to one embodiment of the present disclosure, provided is a method by which a first apparatus performs sidelink communication. In one example, provided is a method by which the first device saves power for sidelink communication in NR V2X.

18 Claims, 28 Drawing Sheets

(51) Int. Cl.
*H04L 1/1812* (2023.01)
*H04W 52/02* (2009.01)
*H04W 72/0446* (2023.01)
*H04W 72/232* (2023.01)

(52) U.S. Cl.
CPC ..... *H04W 72/0446* (2013.01); *H04W 72/232* (2023.01); *H04W 72/25* (2023.01)

(56) References Cited

U.S. PATENT DOCUMENTS

2022/0217680 A1* 7/2022 Li .................... H04W 72/1263
2022/0225290 A1* 7/2022 Ganesan ............... H04W 72/02

OTHER PUBLICATIONS

InterDigital, Inc., "NR Sidelink Mode 2 Resource Allocation," 3GPP TSG RAN WG1 #99, R1-1912740, Reno, USA, Nov. 18-22, 2019, 9 pages.

Lenovo et al., "SL HARQ protocol operation," 3GPP TSG RAN WG2 Meeting #108, R2-1915106 (Update of R2-1912686), Reno, USA, Nov. 18-22, 2019, 6 pages.

* cited by examiner

METHOD AND DEVICE FOR SAVING POWER FOR SIDELINK COMMUNICATION IN NR V2X

CROSS-REFERENCE TO RELATED APPLICATIONS

This application is a National Stage application under 35 U.S.C. § 371 of International Application No. PCT/KR2021/003107, filed on Mar. 12, 2021, which claims the benefit of Korean Patent Application No. 10-2020-0031366, filed on Mar. 13, 2020, Korean Patent Application No. 10-2020-0031221, filed on Mar. 13, 2020, Korean Patent Application No. 10-2020-0057899, filed on May 14, 2020, Korean Patent Application No. 10-2020-0140297, filed on Oct. 27, 2020, and Korean Patent Application No. 10-2021-0022159, filed on Feb. 18, 2021. The disclosures of the prior applications are incorporated by reference in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

The present disclosure provides a method for communication between devices (or UEs) based on V2X communication, and device(s) (or UE(s)) performing the method.

The present disclosure provides a method for saving power for sidelink communication in NR V2X and device(s) (or UE(s)) performing the method.

Technical Solutions

Based on an embodiment of the present disclosure, provided may be a method for performing sidelink communication by a first device. The method may comprise: transmitting, to a second device, sidelink control information (SCI); transmitting, to the second device, data related to the SCI through a physical sidelink shared channel (PSSCH); determining a physical sidelink feedback channel (PSFCH) resource for receiving a PSFCH from the second device, based on an index of a slot and an index of a subchannel related to the PSSCH; starting a first timer related to the PSFCH resource, based on a failure to monitor the PSFCH in the PSFCH resource; starting a second timer related to a sidelink HARQ retransmission grant for retransmission of the data, based on an expiration of the first timer; and transmitting, to the second device, sidelink HARQ retransmission data, based on a sidelink retransmission resource determined based on the sidelink HARQ retransmission grant, wherein the sidelink HARQ retransmission grant is received from a base station after the second timer is started, and wherein the second timer is stopped after the sidelink HARQ retransmission data is transmitted to the second device.

Based on an embodiment of the present disclosure, provided may be a first device adapted to perform sidelink communication. The first device may comprise: at least one memory storing instructions; at least one transceiver; and at least one processor connected to the at least one memory and the at least one transceiver. The at least one processor may execute the instructions to: control the at least one transceiver to transmit, to a second device, sidelink control information (SCI); control the at least one transceiver to transmit, to the second device, data related to the SCI through a physical sidelink shared channel (PSSCH); determine a physical sidelink feedback channel (PSFCH) resource for receiving a PSFCH from the second device, based on an index of a slot and an index of a subchannel related to the PSSCH; start a first timer related to the PSFCH resource, based on a failure to monitor the PSFCH in the PSFCH resource; start a second timer related to a sidelink HARQ retransmission grant for retransmission of the data, based on an expiration of the first timer; and control the at least one transceiver to transmit, to the second device, sidelink HARQ retransmission data, based on a sidelink retransmission resource determined based on the sidelink HARQ retransmission grant, wherein the sidelink HARQ retransmission grant is received from a base station after the second timer is started, and wherein the second timer is stopped after the sidelink HARQ retransmission data is transmitted to the second device.

Based on an embodiment of the present disclosure, provided may be a device (or chip(set)) adapted to control a first user equipment (UE). The device may comprise: at least one processor; and at least one memory connected to the at least one processor and storing instructions. The at least one processor may execute the instructions to: transmit, to a second UE, sidelink control information (SCI); transmit, to the second UE, data related to the SCI through a physical sidelink shared channel (PSSCH); determine a physical sidelink feedback channel (PSFCH) resource for receiving a PSFCH from the second UE, based on an index of a slot and an index of a subchannel related to the PSSCH; start a first timer related to the PSFCH resource, based on a failure to monitor the PSFCH in the PSFCH resource; start a second timer related to a sidelink HARQ retransmission grant for retransmission of the data, based on an expiration of the first timer; and transmit, to the second UE, sidelink HARQ retransmission data, based on a sidelink retransmission resource determined based on the sidelink HARQ retransmission grant, wherein the sidelink HARQ retransmission grant is received from a base station after the second timer is started, and wherein the second timer is stopped after the sidelink HARQ retransmission data is transmitted to the second UE.

Based on an embodiment of the present disclosure, provided may be a non-transitory computer-readable storage medium storing instructions (or commands). The instructions, when executed, may cause a first device to: transmit, to a second device, sidelink control information (SCI); transmit, to the second device, data related to the SCI through a physical sidelink shared channel (PSSCH); determine a physical sidelink feedback channel (PSFCH) resource for receiving a PSFCH from the second device, based on an index of a slot and an index of a subchannel related to the PSSCH; start a first timer related to the PSFCH resource, based on a failure to monitor the PSFCH in the PSFCH resource; start a second timer related to a sidelink HARQ retransmission grant for retransmission of the data, based on an expiration of the first timer; and transmit, to the second device, sidelink HARQ retransmission data, based on a sidelink retransmission resource determined based on the sidelink HARQ retransmission grant, wherein the sidelink HARQ retransmission grant is received from a base station after the second timer is started, and wherein the second timer is stopped after the sidelink HARQ retransmission data is transmitted to the second device.

Based on an embodiment of the present disclosure, provided may be a method for performing sidelink communication by a third device. The method may comprise: receiving, from a fourth device, sidelink control information (SCI); receiving, from the fourth device, data related to the SCI through a physical sidelink shared channel (PSSCH); starting a first timer related to sidelink hybrid automatic repeat request (HARQ) feedback information, based on a first priority value of the sidelink HARQ feedback information related to the data; starting a second timer related to the SCI or a sidelink HARQ retransmission packet for the PSSCH, based on an expiration of the first timer, and receiving, from the fourth device, the sidelink HARQ retransmission packet, wherein the sidelink HARQ retransmission packet is received from the fourth device after the second timer is started, wherein the second timer is stopped after the sidelink HARQ retransmission packet is received from the fourth device, and wherein the first priority value of the sidelink HARQ feedback information is greater than a second priority value related to uplink transmission to a base station.

Based on an embodiment of the present disclosure, provided may be a third device adapted to perform sidelink communication. The third device may comprise: at least one memory storing instructions; at least one transceiver; and at least one processor connected to the at least one memory and the at least one transceiver. The at least one processor may execute the instructions to: control the at least one transceiver to receive, from a fourth device, sidelink control information (SCI); control the at least one transceiver to receive, from the fourth device, data related to the SCI through a physical sidelink shared channel (PSSCH); start a first timer related to sidelink hybrid automatic repeat request (HARQ) feedback information, based on a first priority value of the sidelink HARQ feedback information related to the data; start a second timer related to the SCI or a sidelink HARQ retransmission packet for the PSSCH, based on an expiration of the first timer; and control the at least one transceiver to receive, from the fourth device, the sidelink HARQ retransmission packet, wherein the sidelink HARQ retransmission packet is received from the fourth device after the second timer is started, wherein the second timer is stopped after the sidelink HARQ retransmission packet is received from the fourth device, and wherein the first priority value of the sidelink HARQ feedback information is greater than a second priority value related to uplink transmission to a base station.

Effects of the Disclosure

Based on the present disclosure, V2X communication between devices (or UEs) can be efficiently performed.

Based on the present disclosure, it is possible to efficiently save power for sidelink communication in NR V2X.

Based on the present disclosure, even if a sidelink DRX on-duration period of a transmission user equipment (TX UE) operating based on a sidelink discontinuous reception (DRX) is expired, if condition(s) for determining that transmission and reception of sidelink data is necessary is satisfied, the TX UE may continue to perform sidelink transmission by remaining in an active mode without transition to a sleep mode. In addition, if condition(s) for determining that transmission and reception of sidelink data is not necessary is satisfied, power consumption can be reduced by transition to the sleep mode.

DESCRIPTION OF EXEMPLARY EMBODIMENTS

Figure 1:
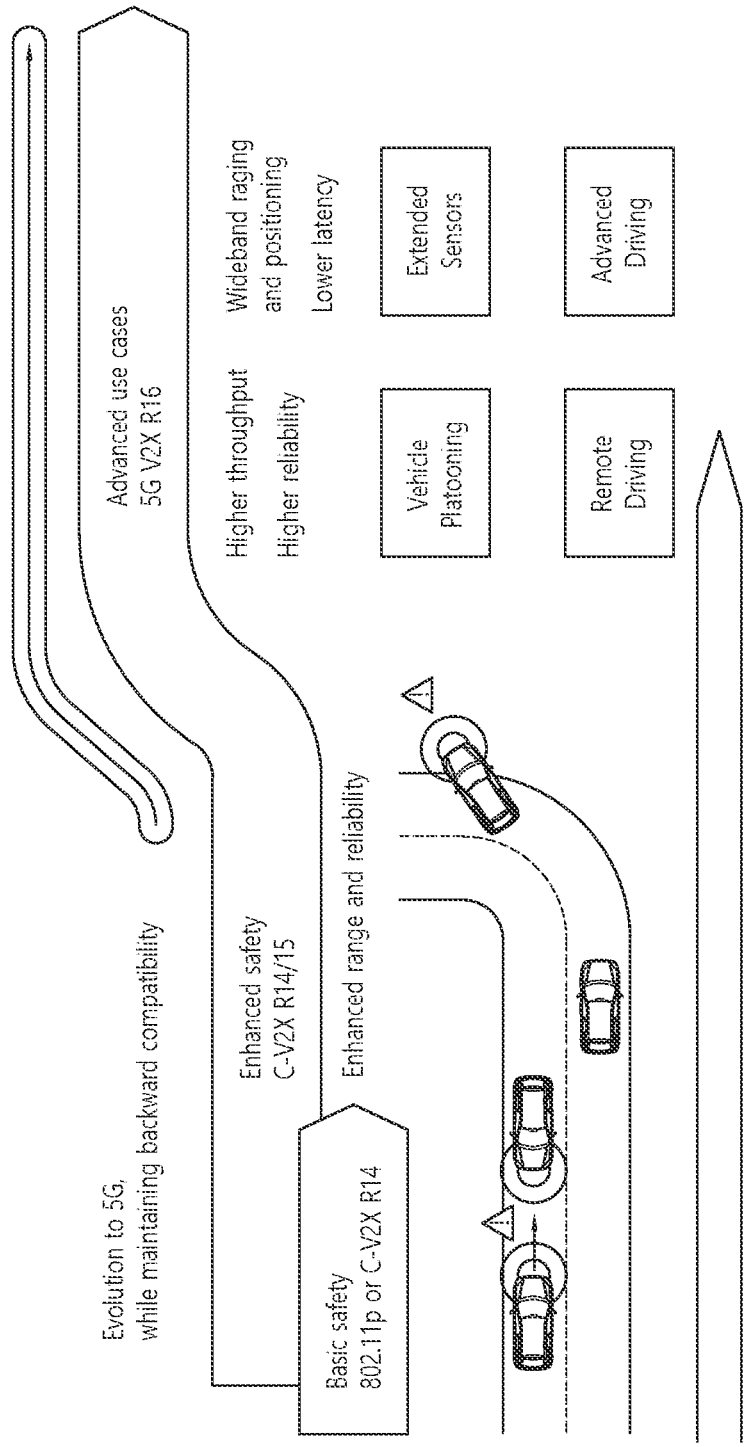
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A. B, and C" may mean "only A", "only B", "only C", or "any combination of A. B. and C". In addition, "at least one of A. B, or C" or "at least one of A, B. and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
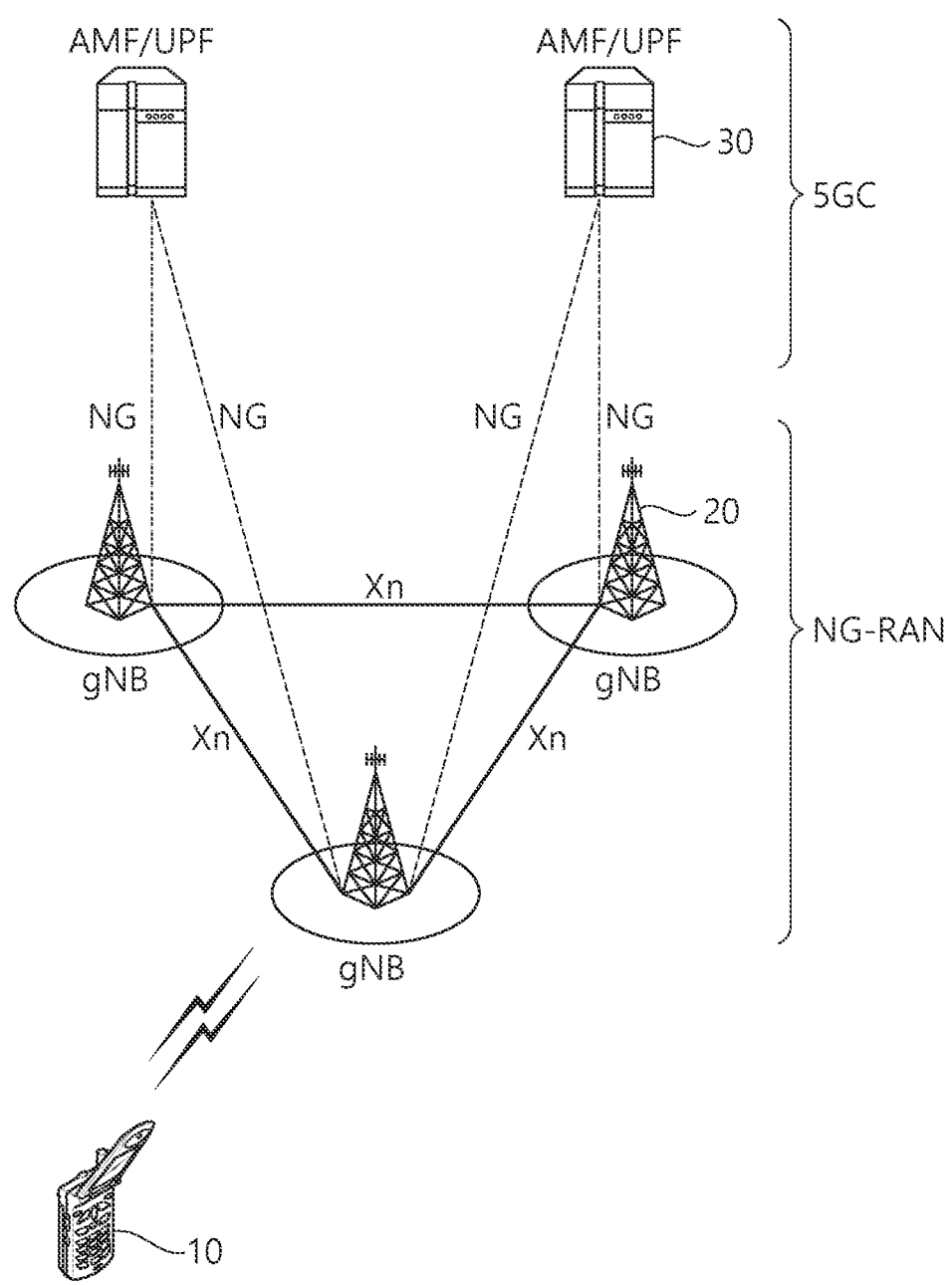
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
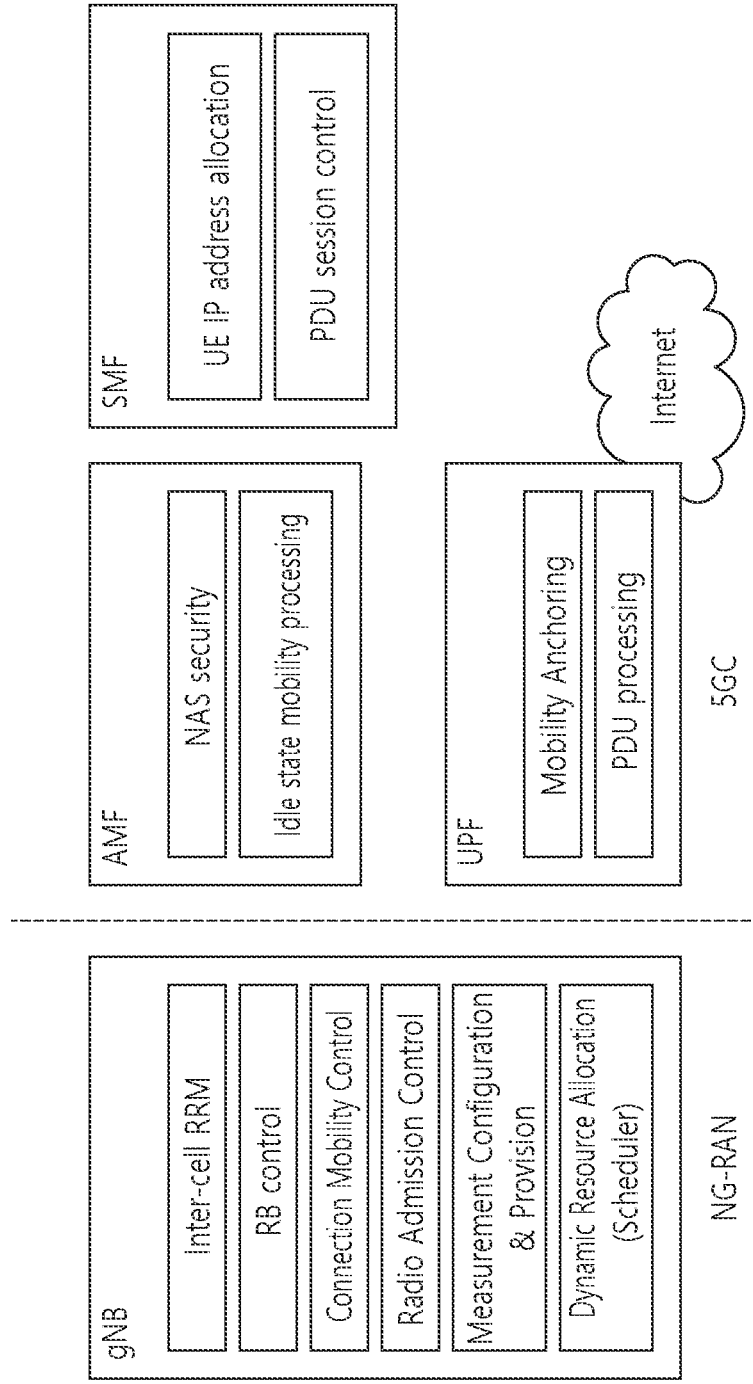
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4A:
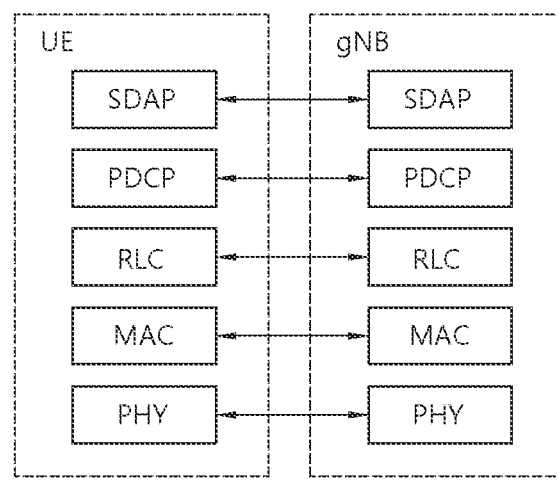
FIGS. 4A and 4B show a radio protocol architecture, based on an embodiment of the present disclosure.
Figure 4B:
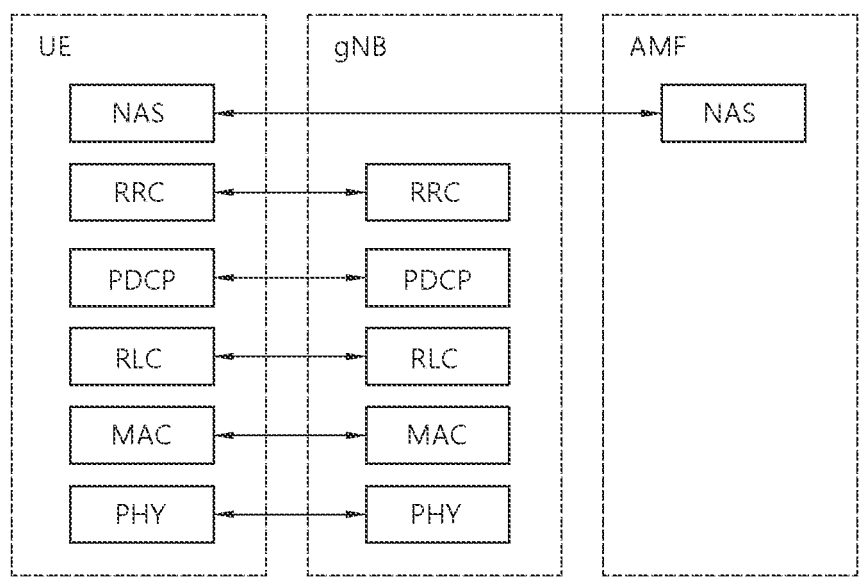

FIGS. 4A and 4B show a radio protocol architecture, based on an embodiment of the present disclosure. The embodiment of FIGS. 4A and 4B may be combined with various embodiments of the present disclosure. Specifically, FIG. 4A shows a radio protocol architecture for a user plane, and FIG. 4B shows a radio protocol architecture for a control plane. The user plane corresponds to a protocol stack for user data transmission, and the control plane corresponds to a protocol stack for control signal transmission.

Referring to FIGS. 4A and 4B, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
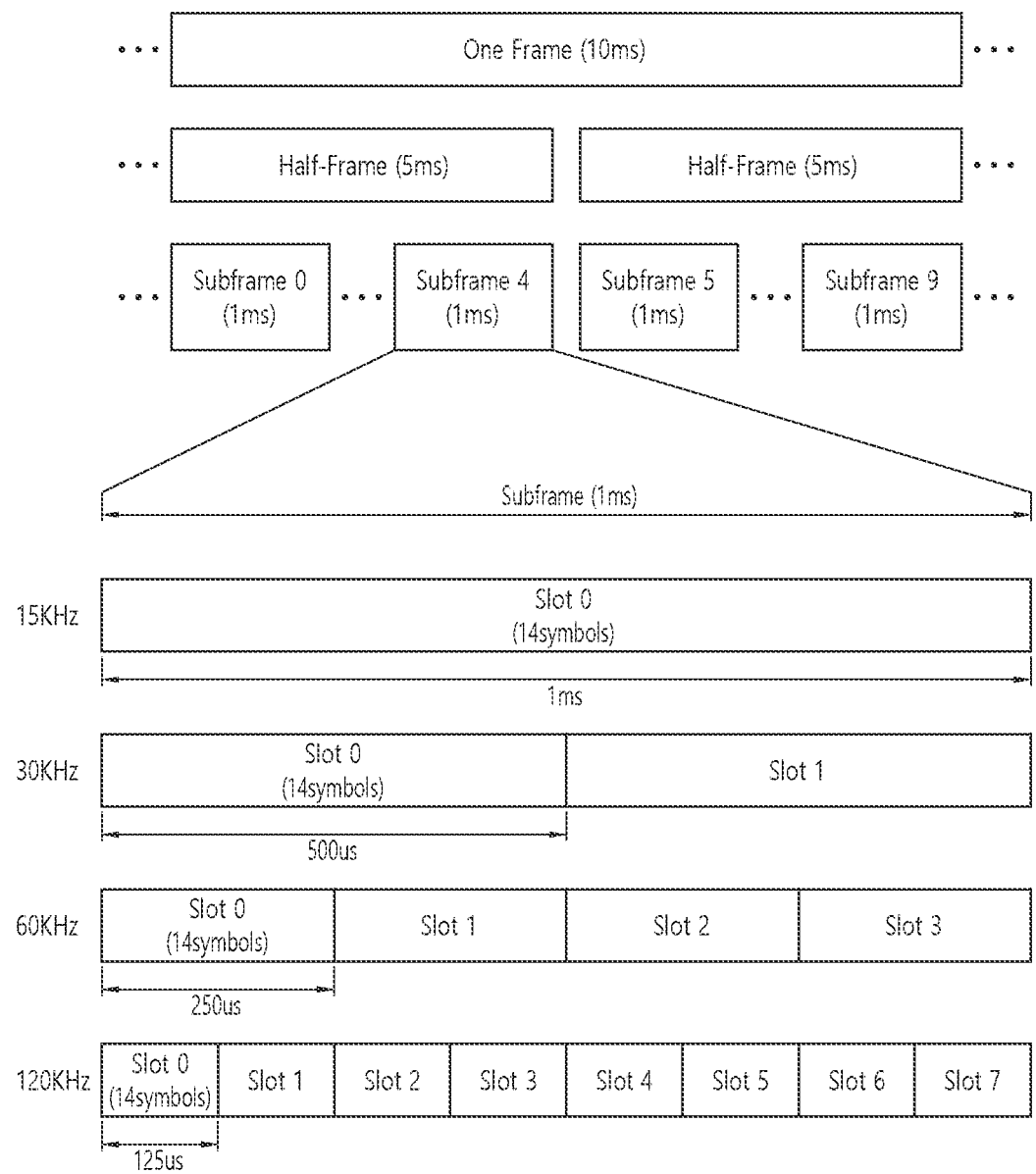
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,\mu}_{slot}$), and a number of slots per subframe ($N^{subframe,\mu}_{slot}$) based on an SCS configuration (u), in a case where a normal CP is used.

TABLE 1

| SCS (15*2$^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*2$^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically. FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 6:
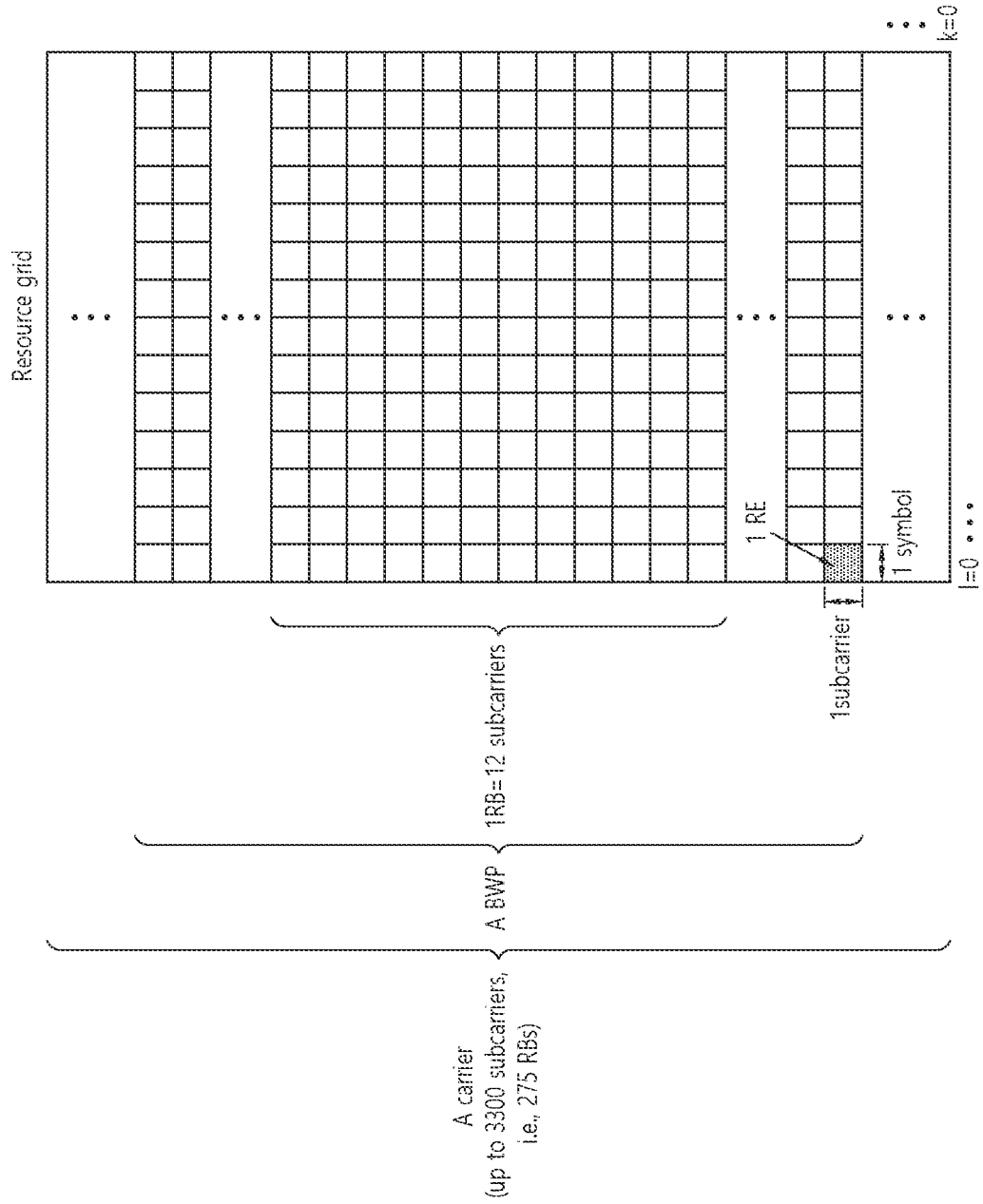
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
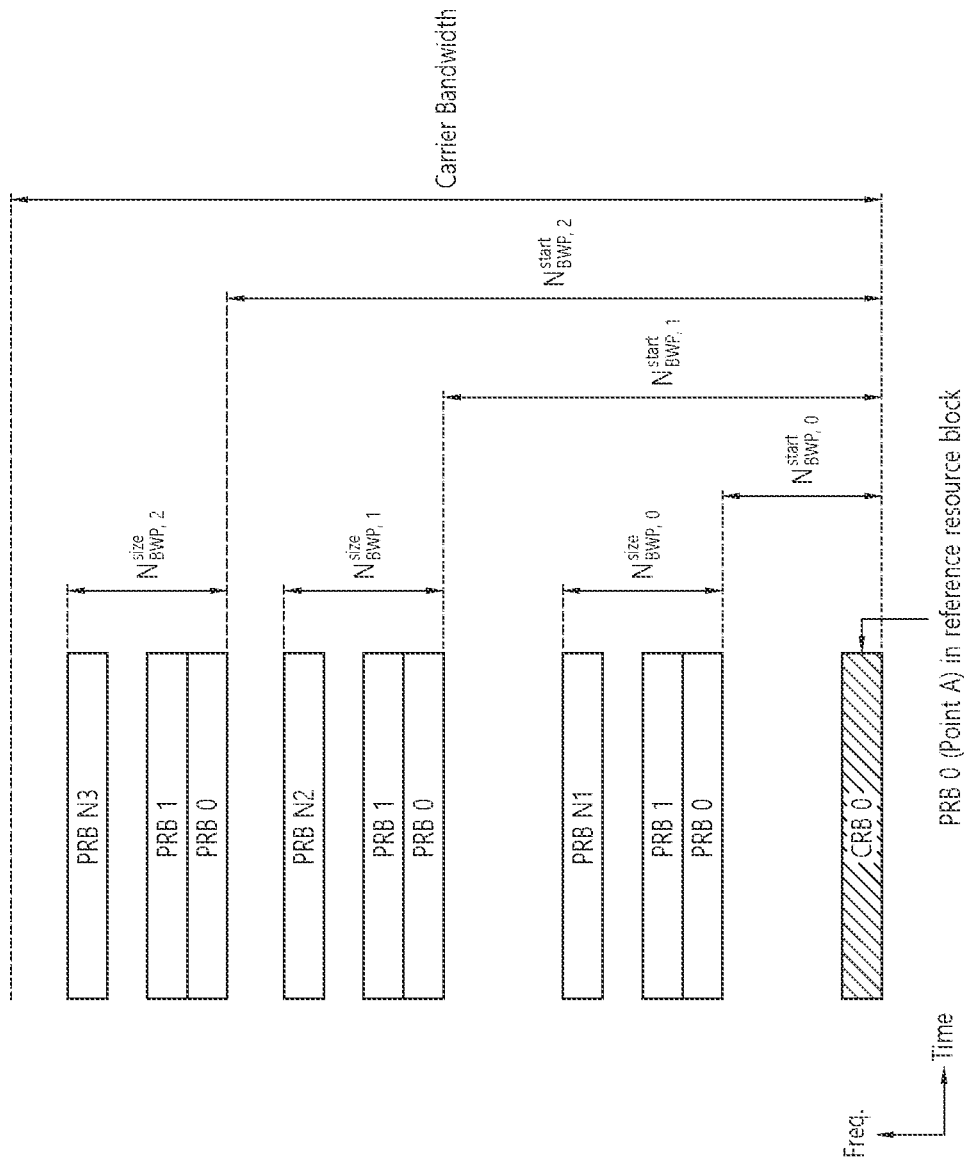
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8A:
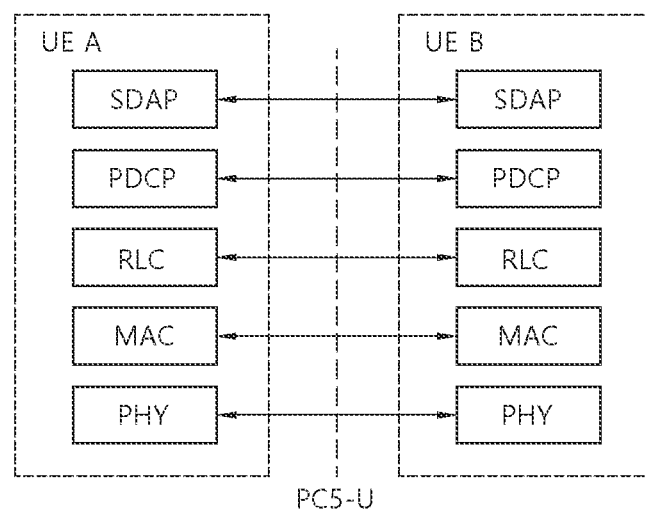
FIGS. 8A and 8B show a radio protocol architecture for a SL communication, based on an embodiment of the present disclosure.
Figure 8B:
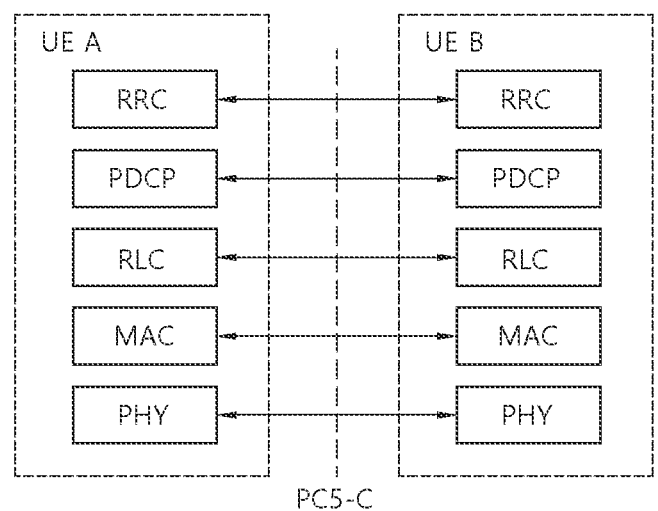

FIGS. 8A and 8B show a radio protocol architecture for a SL communication, based on an embodiment of the present disclosure. The embodiment of FIGS. 8A and 8B may be combined with various embodiments of the present disclosure. More specifically, FIG. 8A shows a user plane protocol stack, and FIG. 8B shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
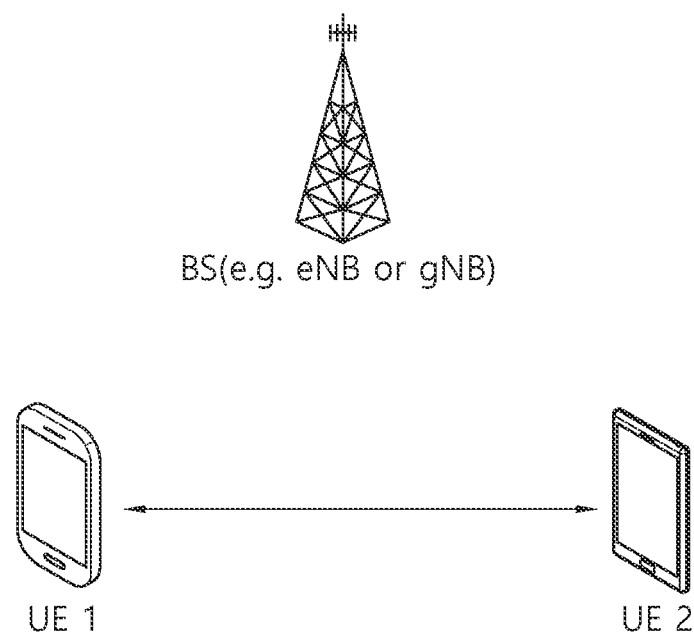
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10A:
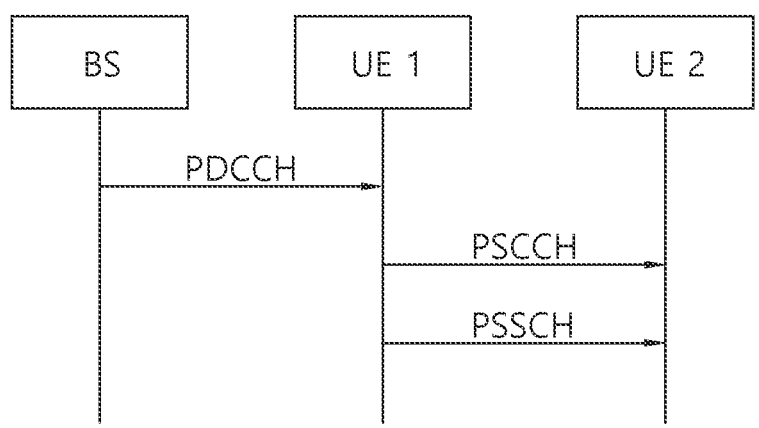
FIGS. 10A and 10B show a procedure of performing V2X or SL communication by a UE based on a transmission mode, based on an embodiment of the present disclosure.
Figure 10B:
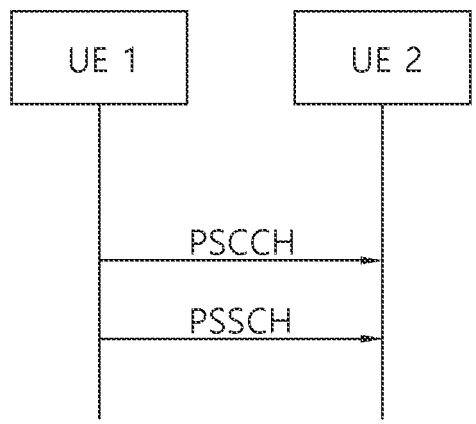

FIGS. 10A and 10B show a procedure of performing V2X or SL communication by a UE based on a transmission mode, based on an embodiment of the present disclosure. The embodiment of FIGS. 10A and 10B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10A shows a UE operation related to an LTE transmission mode 1 or an LTE transmission mode 3. Alternatively, for example, FIG. 10A shows a UE operation related to an NR resource allocation mode 1. For example, the LTE transmission mode 1 may be applied to general SL communication, and the LTE transmission mode 3 may be applied to V2X communication.

For example. FIG. 10B shows a UE operation related to an LTE transmission mode 2 or an LTE transmission mode 4. Alternatively, for example, FIG. 10B shows a UE operation related to an NR resource allocation mode 2.

Referring to FIG. 10A, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11A:
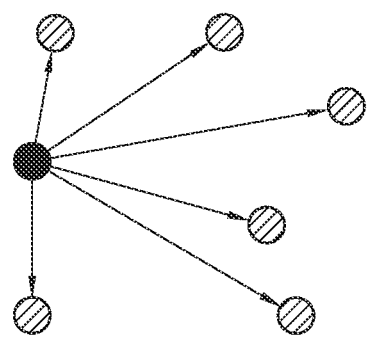
FIGS. 11A to 11C show three cast types, based on an embodiment of the present disclosure.
Figure 11B:
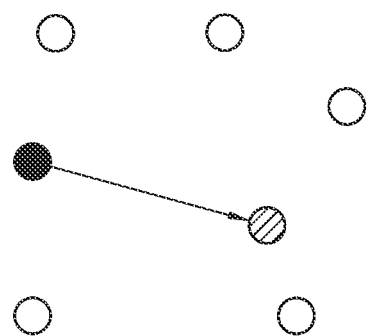
Figure 11C:
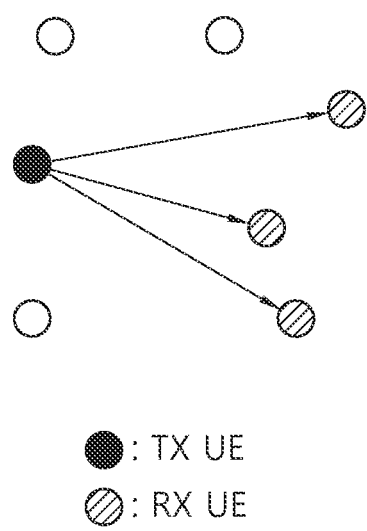

FIGS. 11A to 11C show three cast types, based on an embodiment of the present disclosure. The embodiment of FIGS. 11A to 11C may be combined with various embodiments of the present disclosure. Specifically, FIG. 11A shows broadcast-type SL communication, FIG. 11B shows unicast type-SL communication, and FIG. 11C shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in SL communication, a UE needs to efficiently select resource(s) for SL transmission. Hereinafter, based on various embodiments of the present disclosure, a method for a UE to efficiently select resource(s) for SL transmission and an apparatus supporting the same will be described. In various embodiments of the present disclosure, SL communication may include V2X communication.

At least one of the methods that are proposed based on the various embodiments of the present disclosure may be applied to at least one of unicast communication, groupcast communication, and/or broadcast communication.

At least one of the methods that are proposed based on the various embodiments of the present disclosure may be applied not only to PC5 interface or SL interface (e.g., PSCCH, PSSCH, PSBCH, PSSS/SSSS, and so on) based SL communication or V2X communication but also to Uu interface (e.g., PUSCH, PDSCH, PDCCH, PUCCH, and so on) based SL communication or V2X communication.

In the various embodiments of the present disclosure, receiving operation(s) of the UE may include decoding operation(s) and/or receiving operation(s) of SL channel(s) and/or SL signal(s) (e.g., PSCCH. PSSCH, PSFCH, PSBCH, PSSS/SSSS, and so on). Receiving operation(s) of the UE may include decoding operation(s) and/or receiving operation(s) of WAN DL channel(s) and/or WAN DL signal(s) (e.g., PDCCH, PDSCH, PSS/SSS, and so on). Receiving operation(s) of the UE may include sensing operation(s) and/or channel busy ratio (CBR) measuring operation(s). In the various embodiments of the present disclosure, sensing operation(s) of the UE may include PSSCH-RSRP measuring operation(s) based on PSSCH DM-RS sequence(s), PSSCH-RSRP measuring operation(s) based on PSSCH DM-RS sequence(s), which is scheduled by a PSCCH that is successfully decoded by the UE, sidelink RSSI (S-RSSI) measuring operation(s), and/or S-RSSI measuring operation(s) based on subchannel(s) related to V2X resource pool(s). In the various embodiments of the present disclosure, transmitting operation(s) of the UE may include transmitting operation(s) of SL channel(s) and/or SL signal(s) (e.g., PSCCH, PSSCH, PSFCH, PSBCH, PSSS/SSSS, and so on). Transmitting operation(s) may include transmitting operation(s) of WAN UL channel(s) and/or WAN UL signal(s) (e.g., PUSCH, PUCCH, SRS, and so on). In the various embodiments of the present disclosure, a synchronization signal may include an SLSS and/or a PSBCH.

In the various embodiments of the present disclosure, configuration may include signaling, signaling from a network, configuration from a network, and/or a pre-configuration from a network. In the various embodiments of the present disclosure, definition may include signaling, signaling from a network, configuration from a network, and/or a pre-configuration from a network. In the various embodiments of the present disclosure, designation may include signaling, signaling from a network, configuration from a network, and/or a pre-configuration from a network.

In the various embodiments of the present disclosure, ProSe Per Packet Priority (PPPP) may be replaced with ProSe Per Packet Reliability (PPPR), and PPPR may be replaced with PPPP. For example, as the PPPP value becomes smaller, this may indicate a high priority, and, as the PPPP value becomes greater, this may indicate a low priority. For example, as the PPPR value becomes smaller, this may indicate a high reliability, and, as the PPPR value becomes greater, this may indicate a low reliability. For example, a PPPP value related to a service, a packet or a message being related to a high priority may be smaller than a PPPP value related to a service, a packet or a message being related to a low priority. For example, a PPPR value related to a service, a packet or a message being related to a high reliability may be smaller than a PPPR value related to a service, a packet or a message being related to a low reliability.

Meanwhile, in the present disclosure, a high priority may mean a small priority value, and a low priority may mean a large priority value. For example, Table 5 shows an example of priorities.

TABLE 5

| service or logical channel | priority value |
| --- | --- |
| service A or logical channel A | 1 |
| service B or logical channel B | 2 |
| service C or logical channel C | 3 |

Referring to Table 5, for example, service A or logical channel A related to the smallest priority value may have the highest priority. For example, service C or logical channel C related to the largest priority value may have the lowest priority.

In the various embodiments of the present disclosure, a session may include at least one of a unicast session (e.g., a unicast session for SL), a groupcast/multicast session (e.g., a groupcast/multicast session for SL), and/or a broadcast session (e.g., a broadcast session for SL).

In the various embodiments of the present disclosure, a carrier may be replaced with at least one of a BWP and/or a resource pool, or vice versa. For example, a carrier may include at least one of a BWP and/or a resource pool. For example, a carrier may include one or more BWPs. For example, a BWP may include one or more resource pools.

Meanwhile, NR V2X of Release 16 did not support a power saving operation of a user equipment (UE), and NR V2X of Release 17 will support the power saving operation of the UE.

Meanwhile, in a Uu discontinuous reception (DRX) operation according to an embodiment, timers such as drx-HARQ-RTT-TimerDL, drx-HARQ-RTT-TimerUL, drx-RetransmissionTimerDL, drx-RetransmissionTimerUL are defined. Through this, when the UE performs HARQ retransmission, the UE may transit to sleep mode while the round trip time (RTT) timer (drx-HARQ-RTT-TimerDL, drx-HARQ-RTT-TimerUL) is running or the UE may keep an active state while the retransmission timer (drx-RetransmissionTimerDL, drx-RetransmissionTimerUL) is running.

In the present disclosure, in an embodiment, a method of performing a power saving operation when the UE performs retransmission for a transport block in NR V2X by defining "Sidelink drx-HARQ-RTT-Timer-TX" and "Sidelink drx-RetransmissionTimer-TX" is proposed.

In an embodiment of the present disclosure, a method for the UE to perform a power saving operation based on the following sidelink DRX configuration is proposed. More specifically, in the present disclosure, a method of operating based on "Sidelink drx-HARQ-RTT-Timer-TX" and "Sidelink drx-RetransmissionTimer-TX" that may be applied for the UE to operate in a sleep mode or an active mode during the Uu DRX operation or the sidelink DRX operation is proposed.

"Sidelink drx-HARQ-RTT-Timer-TX" and "Sidelink drx-RetransmissionTimer-TX" proposed in the present disclosure may be timers for supporting an operation in which the UE stays in an active mode to receive a signal from a base station and an operation in which the UE stays in a sleep mode not to receive a signal from the base station. Or, "Sidelink drx-HARQ-RTT-Timer-TX (or SL drx-HARQ-RTT-Timer-TX, first timer, etc.)" and "Sidelink drx-RetransmissionTimer-TX (or SL drx-RetransmissionTimer-TX, second timer, etc.)" proposed in the present disclosure may be timers for supporting an operation in which the UE stays in an active mode to receive a sidelink signal and an operation in which the UE stays in a sleep mode not to receive a sidelink signal. In the following description, monitoring a specific channel (e.g., PDCCH, PSCCH, PSSCH, PSFCH) may include receiving the specific channel, performing (blind) decoding for the specific channel, or attempting decoding for the specific channel.

An example of the sidelink DRX configuration is shown in Table 6 below.

TABLE 6

Sidelink DRX configurations

SL drx-onDurationTimer: the duration at the beginning of a DRX Cycle;
SL drx-SlotOffset: the delay before starting the drx-onDurationTimer;
SL drx-InactivityTimer: the duration after the PSCCH occasion in which a PSCCH indicates a new SL transmission for the MAC entity;
SL drx-RetransmissionTimer-TX (per HARQ process or per Sidelink process): the maximum duration until a grant for sidelink retransmission is received; for example, SL drx-RetransmissionTimer-TX operating as Uu DRX Retransmission timer -> per HARQ process, and SL drx-RetransmissionTimer-TX operating as SL DRX retransmission timer -> per sidelink process
SL drx-LongCycleStartOffset: the Long DRX cycle and drx-StartOffset which defines the subframe where the Long and Short DRX Cycle Starts;
SL drx-ShortCycle (optional): the Short DRX cycle;
SL drx-ShortCycleTimer (optional): the duration the UE shall follow the Short DRX cycle;
SL drx-HARQ-RTT-Timer -TX (per HARQ process or per Sidelink process): the minimum duration before a sidelink HARQ retransmission grant is expected by the MAC entity. for example, SL drx-HARQ-RTT-Timer-TX operating as Uu DRX HARQ-RTT timer -> per HARQ process, and SL drx-HARQ-RTT-Timer-TX operating as SL DRX Retransmission timer -> per sidelink process Referring to Table 6, SL drx-RetransmissionTimer-TX according to an embodiment may represent the maximum time duration until a grant for sidelink retransmission is received. For example, the SL drx-RetransmissionTimer-TX timer may be a timer that is started when the SL drx-HARQ-RTT-Timer-TX timer expires, and may be a timer that allows the TX UE to transit to an active state for HARQ retransmission. The TX UE may start monitoring whether the retransmission resource (e.g., a grant for sidelink retransmission) to the RX UE is prepared from the start of SL drx-RetransmissionTimer-TX, and when the retransmission resource is prepared, the TX UE may perform sidelink HARQ retransmission to the RX UE. When transmitting the HARQ retransmission packet to the RX UE, the TX UE may stop the SL drx-RetransmissionTimer-TX timer. The UE may keep the active state while the SL drx-RetransmissionTimer-TX timer is running.

Referring to Table 6. SL drx-HARQ-RTT-Timer-TX according to an embodiment may represent the minimum time duration before a sidelink HARQ retransmission grant is expected by the MAC entity. That is, resource(s) for sidelink HARQ retransmission cannot be prepared until the SL drx-HARQ-RTT-Timer-TX timer expires. Accordingly, the TX UE can reduce power consumption by transitioning to the sleep mode while the SL drx-HARQ-RTT-Timer-TX timer is running. When the SL drx-HARQ-RTT-Timer-TX timer expires, the TX UE may determine that resource(s) for SL retransmission can be prepared, and the TX UE may start (initiate) the SL drx-RetransmissionTimer-TX timer, and the TX UE may monitor whether resource(s) for SL HARQ retransmission is received (since SL HARQ retransmission resource(s) may or may not be received as soon as the SL drx-HARQ-RTT-Timer-TX timer expires, the TX UE may start the SL drx-RetransmissionTimer-TX timer and monitor whether resource(s) for SL HARQ retransmission is received).

In embodiment(s) below, a method for the TX UE performing sidelink communication to save power based on the operation with SL drx-HARQ-RTT-Timer-TX and SL drx-RetransmissionTimer-TX may be provided.

In an embodiment, SL drx-HARQ-RTT-Timer-TX and SL drx-RetransmissionTimer-TX operated by the TX UE may be timers for performing the Uu DRX operation in relation to the base station. Through the Uu DRX operation, for example, monitoring for a physical downlink control channel (PDCCH) (or downlink control information (DCI) transmitted through the PDCCH) may be controlled.

In another embodiment, SL drx-HARQ-RTT-Timer-TX and SL drx-RetransmissionTimer-TX operated by the TX UE may be timers operating for the purpose of synchronizing with SL drx-HARQ-RTT-Timer-RX and/or SL drx-RetransmissionTimer-RX operated by the RX UE for the SL DRX operation of the RX UE. That is, the TX UE may determine/recognize/consider that the RX UE (re)starts or stops SL drx-HARQ-RTT-Timer-RX and/or SL drx-RetransmissionTimer-RX if the following conditions are satisfied.

In an embodiment, if SL drx-HARQ-RTT-Timer-TX and SL drx-RetransmissionTimer-TX operated by the TX UE are timers for performing the Uu DRX operation in relation to the base station, it can be (clearly) distinguished from the prior art (Uu DRX operation between a UE and a base station, that is, two devices) (or another embodiment) since it is the operation among a UE (TX UE), a UE (RX UE), and a base station, that is, three devices. For example, in embodiment(s) according to the present disclosure, if the TX UE receives PSFCH (HARQ feedback NACK or ACK) from the RX UE, the TX UE may start SL drx-HARQ-RTT-Timer-TX and does not monitor a Uu signal (e.g., PDCCH) or may enter a Uu sleep mode (during the RTT duration), and when SL drx-HARQ-RTT-Timer-TX expires, the TX UE may start SL drx-RetransmissionTimer-TX and monitor a mode 1 SL grant from the base station (during the retransmission timer duration). Thus, the embodiment(s) (among three devices such as TX UE/RX UE/base station) can be (clearly) distinguished from a prior art operation (or another embodiment)(between a UE and a base station) in which the UE starts the Uu DRX HARQ RTT timer and does not monitor a Uu signal (e.g., PDCCH) or enters a Uu sleep mode (during the RTT duration), if the UE transmits DL HARQ feedback to the base station, and the UE starts the retransmission timer when the Uu DRX HARQ RTT timer expires and monitor DL assignment from the base station (during the retransmission timer duration).

In another embodiment, if SL drx-HARQ-RTT-Timer-TX and SL drx-RetransmissionTimer-TX operated by the TX UE are timers for performing the Uu DRX operation in relation to the base station, the TX UE may perform a monitoring operation for a Physical Downlink Control Channel (PDCCH) including a mode 1 SL retransmission grant as shown in Table 7 below.

TABLE 7

1. Introduce drx-HARQ-RTT-TimerSL and drx-RetransmissionTimerSL to monitor SL-RNTI, SLCS-RNTI and SL Semi-Persistent Scheduling V-RNTI for SL mode 1
2. the Active Time includes the time while drx-RetransmissionTimerSL is running i.e. to monitor PDCCH addressed to SL-RNTI and/or SLCS-RNTI.
3. UE starts the drx-HARQ-RTT-TimerSL for the corresponding HARQ process ID in the first symbol after the end of the corresponding PSFCH reception carrying the SL HARQ feedback, regardless of whether PUCCH is configured or not. In addition, UE stops drx-RetransmissionTimerSL for the corresponding HARQ process ID.

In an embodiment (or in a first embodiment), if the TX UE receives HARQ NACK feedback from the RX UE after transmitting sidelink control information (SCI) and/or PSSCH (sidelink data) to the RX UE, the TX UE may start SL drx-HARQ-RTT-Timer-TX. The TX UE may transit to the sleep mode and keep the sleep state until SL drx-HARQ-RTT-Timer-TX expires. If the SL drx-HARQ-RTT-Timer-TX timer expires, the TX UE may transit to the active state and start the SL drx-RetransmissionTimer-TX timer, and the TX UE may monitor whether resource(s) for sidelink HARQ retransmission (retransmission resource(s) allocated by the base station to the TX UE) (retransmission resource(s) dynamically allocated by the base station or configured grant type 1 resource(s) or configured grant type 2 resource(s) allocated through an RRC message by the base station) is prepared. If resource(s) for sidelink HARQ retransmission is received, the TX UE may transmit a sidelink HARQ retransmission packet to the RX UE and stop the SL drx-RetransmissionTimer-TX timer. If the TX UE receives HARQ NACK for sidelink HARQ retransmission from the RX UE, the TX UE may restart SL drx-HARQ-RTT-Timer-TX and transit to the sleep mode. And, if the SL drx-HARQ-RTT-Timer-TX timer expires, the TX UE may transit to the active state, restart the SL drx-RetransmissionTimer-TX timer, and monitor whether resource(s) for sidelink HARQ retransmission is received.

In an embodiment (or in a second embodiment), if the TX UE does not receive HARQ feedback (HARQ ACK or NACK) from the RX UE after transmitting SCI and PSSCH (sidelink data) to the RX UE (HARQ discontinuous transmission (DTX) occurs), the TX UE may start SL drx-HARQ-RTT-Timer-TX. In this case, the TX UE may transmit SL HARQ NACK to the base station through PUCCH in order to request retransmission resource(s). The TX UE may transit to the sleep mode and keep the sleep state until SL drx-HARQ-RTT-Timer-TX expires. If the SL drx-HARQ-RTT-Timer-TX timer expires, the TX UE may transit to the active state and start the SL drx-RetransmissionTimer-TX timer, and the TX UE may monitor whether resource(s) for sidelink HARQ retransmission (retransmission resource(s) allocated by the base station to the TX UE) (retransmission resource(s) dynamically allocated by the base station or configured grant type 1 resource(s) or configured grant type 2 resource(s) allocated through an RRC message by the base station) is prepared. If resource(s) for sidelink HARQ retransmission is prepared, the TX UE may transmit an SL HARQ retransmission packet to the RX UE and stop the SL drx-RetransmissionTimer-TX timer. If the TX UE does not receive HARQ feedback (HARQ ACK or HARQ NACK) again for Sidelink HARQ retransmission, the TX UE may restart SL drx-HARQ-RTT-Timer-TX, and the TX UE may transit to the sleep mode after transmitting SL HARQ NACK to the base station through PUCCH. And, if the SL drx-HARQ-RTT-Timer-TX timer expires, the TX UE may transit to the active state, restart the SL drx-RetransmissionTimer-TX timer, and monitor whether resource(s) for sidelink HARQ retransmission is prepared. If SL HARQ DTX occurs as much as a maximum threshold value (SL RLF occurs), the TX UE may not start SL drx-HARQ-RTT-Timer-TX/SL drx-RetransmissionTimer-TX, or the TX UE may stop SL drx-HARQ-RTT-Timer-TX/SL drx-RetransmissionTimer-TX if SL drx-HARQ-RTT-Timer-TX/SL drx-RetransmissionTimer-TX is running and transit to the sleep mode.

In an embodiment (or in a third embodiment), if the TX UE transmits SCI and PSSCH (sidelink data) to the RX UE, or if the TX UE receives HARQ NACK from the RX UE after transmitting PSSCH (sidelink data) to the RX UE, or if the TX UE transmits HARQ NACK to the base station through PUCCH because the TX UE does not receive HARQ feedback (SL HARQ ACK or SL HARQ NACK) after transmitting PSSCH (sidelink data) to the RX UE (HARQ DTX occurs) (i.e., retransmission resource request for sidelink retransmission), SL drx-HARQ-RTT-Timer-TX may be started. The TX UE may transit to the sleep mode and keep the sleep state until SL drx-HARQ-RTT-Timer-TX expires. If the SL drx-HARQ-RTT-Timer-TX timer expires, the TX UE may transit to the active state and start the SL drx-RetransmissionTimer-TX timer, and the TX UE may monitor whether resource(s) for sidelink HARQ retransmission (retransmission resource allocated by the base station to the TX UE) is received. If resource(s) for sidelink HARQ retransmission is received, the TX UE may transmit an SL HARQ retransmission packet to the RX UE and stop the SL drx-RetransmissionTimer-TX timer. If the TX UE receives HARQ NACK from the RX UE for sidelink HARQ retransmission, the TX UE may transmit HARQ NACK to the base station through PUCCH, restart SL drx-HARQ-RTT-Timer-TX, and transit to the sleep mode. And, if the SL drx-HARQ-RTT-Timer-TX timer expires, the TX UE may transit to the active state, restart the SL drx-RetransmissionTimer-TX timer, and monitor whether resource(s) for sidelink HARQ retransmission is received. In addition, if the TX UE receives SL HARQ NACK from the RX UE by a maximum threshold value, the TX UE may not start SL drx-HARQ-RTT-Timer-TX/SL drx-RetransmissionTimer-TX, or the TX UE may stop SL drx-HARQ-RTT-Timer-TX/SL drx-RetransmissionTimer-TX if SL drx-HARQ-RTT-Timer-TX/SL drx-RetransmissionTimer-TX is running and transit to the sleep mode. In addition, in order to indicate to the base station that retransmission resource(s) is no longer needed, SL HARQ ACK may be transmitted through PUCCH.

In an embodiment (or in a fourth embodiment), if the TX UE uses all the currently allocated resources (e.g., mode 1 dynamic scheduling based resource or sidelink configured grant resource) while performing HARQ retransmission for PSSCH transmitted to the RX UE, but does not reach the maximum number of retransmissions, the TX UE may transmit PUCCH for transmitting HARQ NACK for requesting sidelink retransmission resource(s) to the base station. If there is a PUCCH resource for HARQ NACK transmission, the TX UE may transmit PUCCH (e.g., it may include HARQ NACK for a sidelink resource request) to the base station and start SL drx-HARQ-RTT-Timer-TX. The TX UE may transit to the sleep mode and keep the sleep state until SL drx-HARQ-RTT-Timer-TX expires. If the SL drx-HARQ-RTT-Timer-TX timer expires, the TX UE may transit to the active state and start the SL drx-Retransmission-Timer-TX timer, and the TX UE may monitor whether resource(s) for sidelink HARQ retransmission (retransmission resource allocated by the base station to the TX UE) is received. If resource(s) for sidelink HARQ retransmission is received, the TX UE may transmit an SL HARQ retransmission packet to the RX UE and stop the SL drx-RetransmissionTimer-TX timer. If the TX UE receives HARQ NACK related to the sidelink HARQ retransmission from the RX UE and there is a PUCCH resource for HARQ NACK transmission, the TX UE may transmit PUCCH (e.g., including HARQ NACK for a sidelink resource request) to the base station, restart SL drx-HARQ-RTT-Timer-TX, and transit to the sleep mode. And, if the TX UE expires the SL drx-HARQ-RTT-Timer-TX timer, the TX UE may transit to the active state, restart the SL drx-RetransmissionTimer-TX timer, and monitor whether resource(s) for sidelink HARQ retransmission is received.

In an embodiment (or in a fifth embodiment), if the TX UE uses all the currently allocated resources (e.g., mode 1 dynamic scheduling based resource or sidelink configured grant resource) while performing HARQ retransmission for PSSCH transmitted to the RX UE, but does not reach the maximum number of retransmissions, the TX UE may transmit PUCCH for transmitting HARQ NACK for requesting sidelink retransmission resource(s) to the base station. If the TX UE cannot report HARQ NACK (for PSSCH) to the base station because there is no PUCCH resource for transmitting the HARQ NACK, the TX UE may not start SL drx-HARQ-RTT-Timer-TX. In addition, even if an SL DRX on-duration period remains (or even if operating in an SL active time), power consumption may be reduced by transiting to the sleep mode.

In an embodiment (or in a sixth embodiment), if there is no mode 1 resource (SR/BSR-based resource or RRC signaling-based configured grant resource) for sidelink transmission, the TX UE may perform retransmission for a transport block transmitted to the RX UE by converting to the mode 2 resource allocation scheme. In this case, if the TX UE converts to the mode 2 resource allocation scheme, in this embodiment, the TX UE may start SL drx-HARQ-RTT-Timer-TX. The TX UE may transit to the sleep mode and keep the sleep state until SL drx-HARQ-RTT-Timer-TX expires. If SL drx-HARQ-RTT-Timer-TX expires, the TX UE may restart the SL drx-RetransmissionTimer-TX timer, and if mode 2 resource(s) for sidelink HARQ retransmission is prepared, the TX UE may perform sidelink HARQ retransmission and stop the SL drx-RetransmissionTimer-TX timer.

In an embodiment (or in a seventh embodiment), if the maximum number of retransmissions is not reached while performing HARQ retransmission for PSSCH transmitted by the TX UE to the RX UE, but there is no PUCCH resource for transmitting HARQ NACK for requesting sidelink retransmission resource(s) to the base station, the TX UE may perform retransmission for the transport block transmitted to the RX UE by converting to the mode 2 resource allocation scheme. In this case, if the TX UE converts to the mode 2 resource allocation scheme, in this embodiment, the TX UE may start SL drx-HARQ-RTT-Timer-TX. The TX UE may transit to the sleep mode and keep the sleep state until SL drx-HARQ-RTT-Timer-TX expires. If SL drx-HARQ-RTT-Timer-TX expires, the TX UE may restart the SL drx-RetransmissionTimer-TX timer, and the TX UE may perform sidelink HARQ retransmission if mode 2 resource(s) for sidelink HARQ retransmission is prepared, and the TX UE may stop the SL drx-RetransmissionTimer-TX timer. Or, when changing to the mode 2 resource allocation scheme, the TX UE may not start drx-HARQ-RTT-Timer-TX, and the TX UE may keep the active state continuously until performing retransmission.

In an embodiment (or in an eighth embodiment), if the TX UE transmits PSCCH and/or PSSCH (sidelink data) to the RX UE or if the TX UE does not receive HARQ feedback (SL HARQ ACK or SL HARQ NACK) from the RX UE after transmitting PSSCH (sidelink data) to the RX UE (SL HARQ DTX occurs), the occurrence of SL HARQ DTX may be reported from the physical layer to the MAC layer, and the TX UE may start SL drx-HARQ-RTT-Timer-TX. The TX UE may keep the sleep state by transiting to the sleep mode until SL drx-HARQ-RTT-Timer-TX expires. If the SL drx-HARQ-RTT-Timer-TX timer expires, the TX UE may transit to the active state and start the SL drx-RetransmissionTimer-TX timer, and the TX UE may monitor whether resource(s) for sidelink HARQ retransmission (retransmission resource(s) allocated by the base station to the TX UE) (e.g., retransmission resource(s) dynamically allocated by the base station or configured grant type 1 resource(s) or configured grant type 2 resource(s) allocated through an RRC message by the base station) is prepared. If resource(s) for sidelink HARQ retransmission is prepared, the TX UE may transmit an SL HARQ retransmission packet to the RX UE and stop the SL drx-RetransmissionTimer-TX timer. If the TX UE does not receive HARQ feedback (SL HARQ ACK or SL HARQ NACK) again for sidelink HARQ retransmission (PSCCH/PSSCH), the occurrence of SL HARQ DTX may be reported from the physical layer to the MAC layer again, the TX UE may restart SL drx-HARQ-RTT-Timer-TX and transit to the sleep mode. And, if the SL drx-HARQ-RTT-Timer-TX timer expires, the TX UE may transit to the active state, restart the SL drx-RetransmissionTimer-TX timer, and monitor whether resource(s) for sidelink HARQ retransmission is prepared.

In an embodiment (or in a ninth embodiment), after the TX UE transmits PSCCH (SCI) and/or PSSCH (sidelink data) to the RX UE, the TX UE should monitor SL HARQ feedback (SL HARQ ACK or SL HARQ NACK) transmitted by the RX UE. However, even if the TX UE fails to perform PSFCH monitoring due to a half duplex problem (a problem that occurs because the UE cannot transmit and receive at the same time), the TX UE may start SL drx-HARQ-RTT-Timer-TX (if the half duplex problem did not occur, the TX UE may have received SL HARQ feedback transmitted by the RX UE by monitoring PSFCH) (if the half duplex problem did not occur, the TX UE may have received SL HARQ feedback transmitted by the RX UE by monitoring PSFCH, so the TX UE should start the SL drx-HARQ-RTT-Timer-TX timer). The TX UE may transit to the sleep mode and keep the sleep state until SL drx-HARQ-RTT-Timer-TX expires. If the SL drx-HARQ-RTT-Timer-TX timer expires, the TX UE may transit to the active state and start the SL drx-RetransmissionTimer-TX timer, and the TX UE may monitor whether resource(s) for sidelink HARQ retransmission (retransmission resource(s) allocated by the base station to the TX UE) (retransmission resource(s) dynamically allocated by the base station or configured grant type 1 resource(s) or configured grant type 2 resource(s) allocated through an RRC message by the base station) is prepared. If resource(s) for sidelink HARQ retransmission is prepared, the TX UE may transmit an SL HARQ retransmission packet to the RX UE and stop the SL drx-RetransmissionTimer-TX timer. In addition, the TX UE may monitor PSFCH to receive SL HARQ feedback (SL HARQ ACK or SL HARQ NACK) transmitted by the RX UE.

Figure 12:
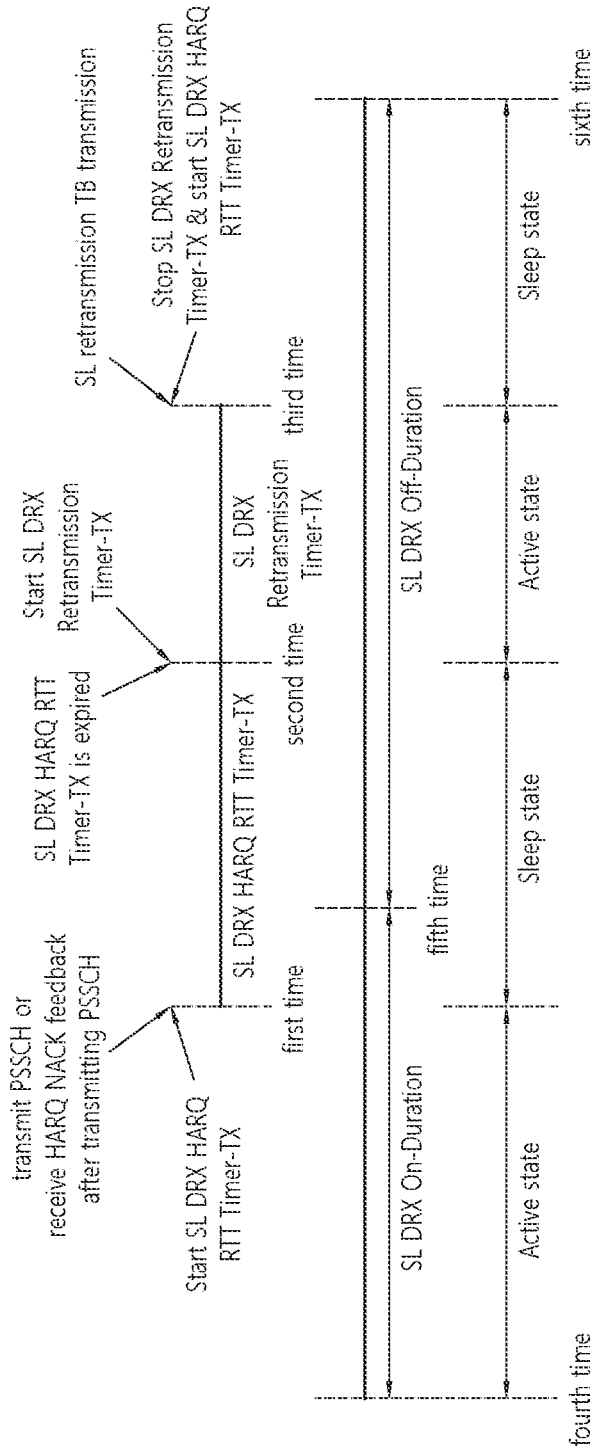
FIG. 12 shows an example of a method for a TX UE to save power consumption for sidelink communication based on an embodiment.

FIG. 12 shows an example of a method for a TX UE to save power consumption for sidelink communication based on an embodiment.

More specifically, FIG. 12 shows an example of a method for a TX UE to save power based on the operations of SL drx-HARQ-RTT-Timer-TX and SL drx-RetransmissionTimer-TX, proposed by the embodiment(s) of the present disclosure.

As shown in FIG. 12, if the TX UE transmits PSSCH to the RX UE or if the TX UE receives HARQ NACK from the RX UE after transmitting PSSCH to the RX UE, the TX UE may start SL drx-HARQ-RTT-Timer-TX, and the TX UE may transit to the sleep mode until SL resource(s) for retransmission is prepared (until SL drx-HARQ-RTT-Timer-TX expires). If the SL drx-HARQ-RTT-Timer-TX expires (retransmission resource(s) is prepared), the TX UE may transit to the active state and start SL DRX Retransmission timer-TX. In addition, if the TX UE performs retransmission through the retransmission resource(s) for the transport block determined as HARQ NACK, the TX UE may stop SL DRX Retransmission timer-TX, start SL DRX HARQ RTT timer-TX, and transit to the sleep state.

Figure 13:
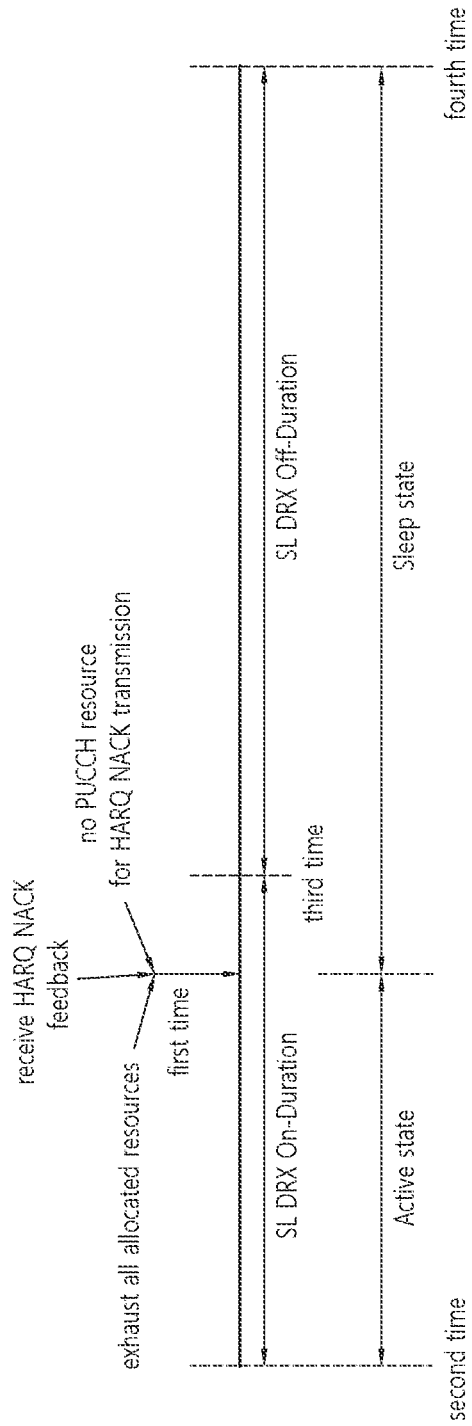
FIG. 13 shows another example of a method for a TX UE to save power consumption for sidelink communication based on another embodiment.

FIG. 13 shows another example of a method for a TX UE to save power consumption for sidelink communication based on another embodiment.

More specifically, FIG. 13 shows another example of a method for a TX UE to save power based on the operations of SL drx-HARQ-RTT-Timer-TX and SL drx-RetransmissionTimer-TX, proposed by the embodiment(s) of the present disclosure.

As shown in FIG. 13, if the TX UE receives HARQ NACK from the RX UE or does not receive HARQ feedback after transmitting PSSCH to the RX UE (HARQ DTX occurs), and if there is no more allocated SL retransmission resource, the TX UE may request sidelink retransmission resource(s) by reporting HARQ NACK to the base station through PUCCH. However, if there is no PUCCH resource in the allocated resource, the TX UE cannot be allocated retransmission resource(s) since the TX UE cannot report HARQ NACK to the base station. Therefore, in this case (if the maximum number of retransmissions remains, but there is no sidelink retransmission resource and there is no PUCCH resource to request sidelink retransmission resource(s)), the TX UE may transit to the sleep mode to reduce power consumption.

Figure 14:
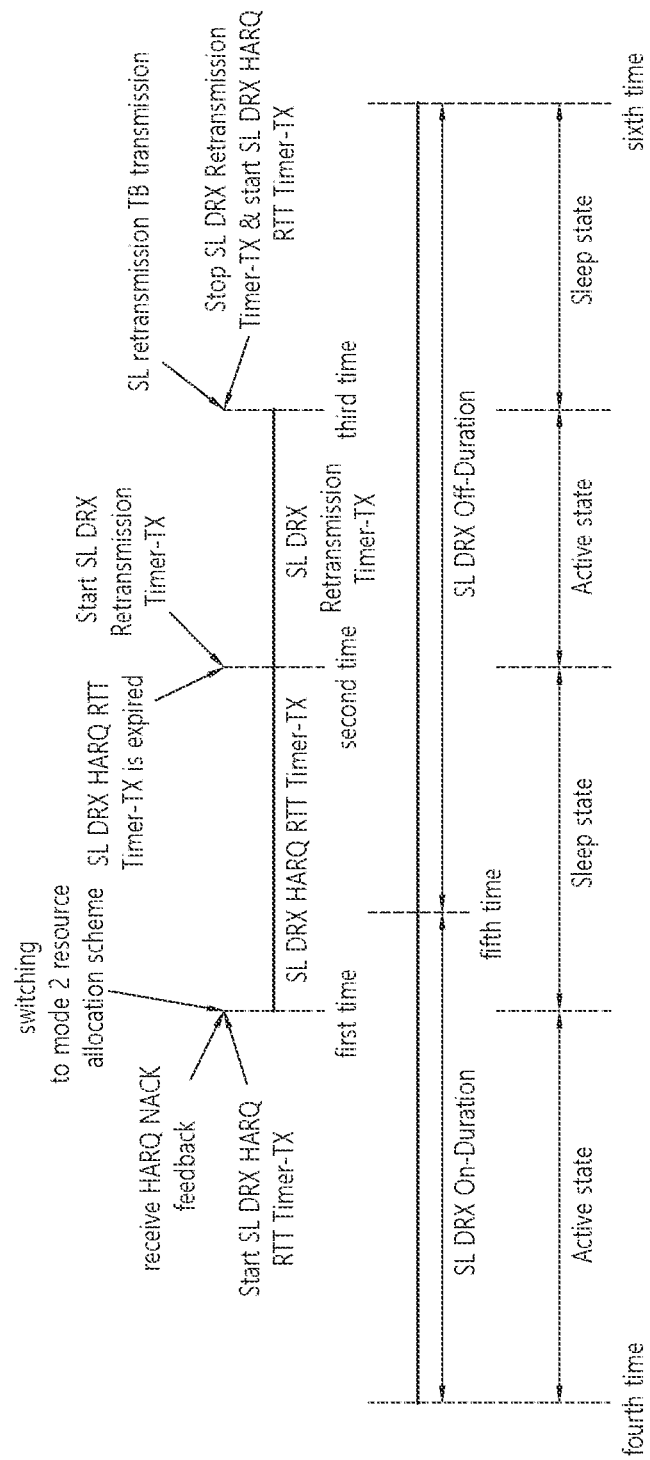
FIG. 14 shows another example of a method for a TX UE to save power consumption for sidelink communication based on another embodiment.

FIG. 14 shows another example of a method for a TX UE to save power consumption for sidelink communication based on another embodiment.

More specifically, FIG. 14 shows another example of a method for a TX UE to save power based on the operations of SL drx-HARQ-RTT-Timer-TX and SL drx-RetransmissionTimer-TX, proposed by the embodiment(s) of the present disclosure.

As shown in FIG. 14, if the TX UE receives HARQ NACK from the RX UE after transmitting PSSCH to the RX UE but there is no mode 1 resource, the TX UE may continue sidelink communication by switching to the mode 2 resource allocation scheme. If the TX UE receives HARQ NACK from the RX UE but there is no mode 1 resource, the TX UE may switch to mode 2 resource allocation mode, start SL DRX HARQ RTT-TX at the same time, and transit to the sleep mode until SL resource(s) for retransmission is prepared (until SL drx-HARQ-RTT-Timer-TX expires). If SL drx-HARQ-RTT-Timer-TX expires (mode 2 retransmission resource(s) is prepared), the TX UE may transit to the active state and start SL drx-RetransmissionTimer-TX. In addition, if the TX UE performs retransmission through the mode 2 retransmission resource(s) for the transport block determined as HARQ NACK, the TX UE may stop SL drx-RetransmissionTimer-TX, start SL drx-HARQ-RTT-Timer-TX, and transit to the sleep state.

In some embodiments of the present disclosure, even if the current sidelink DRX time of the UE (TX UE or RX UE) is a sidelink DRX off-duration (e.g., duration in which a sidelink signal is not sensed/monitor/received/transmitted), if the condition(s) below is satisfied, the UE may operate in an active state/time (e.g., duration in which a sidelink signal can be sensed/monitor/received/transmitted) for a predetermined time (predefined time, predefined timer, "Sidelink DRX-RTTTimer: the time when resource(s) for sidelink retransmission of the UE (TX UE or RX UE) is prepared or the minimum time that sidelink retransmission is expected (time to operate in sleep mode with the expectation that sidelink retransmission will not be performed from the other UE before the corresponding time expires)", "Sidelink DRX-RetransmissionTimer: the time when the UE (TX UE or RX UE) monitors the sidelink retransmission packet transmitted by the other UE or the time to perform retransmission using the sidelink retransmission resource", timer defined so that the UE (TX UE or RX UE) operates in the active state/time for the duration of the timer in the sidelink DRX off-duration period).

A condition (or a first condition) according to an embodiment is that a sidelink congestion level is equal to or greater than a predetermined threshold.

A condition (or a second condition) according to an embodiment is that sidelink TX data with a sidelink priority greater than or equal to a threshold is buffered in the buffer of the TX UE in a sidelink DRX off-duration (duration in which a sidelink signal is not sensed/monitor/received/transmitted).

A condition (or a third condition) according to an embodiment is that PSFCH for PSCCH/PSSCH transmitted by the TX UE is received from the RX UE by more than or equal to a threshold A condition (or a fourth condition) according to an embodiment is that sidelink DTX (e.g., sidelink HARQ ACK or NACK is not received, or PSFCH is not monitored) for PSCCH/PSSCH transmitted by the TX UE occurs from the RX UE by more than or equal to a threshold A condition (or a fifth condition) according to an embodiment is that the number of remaining transmissions of the maximum number of transmissions of 1 transport block (TB) transmitted by the TX UE does not exceed a threshold. That is, it is a case in which the remaining number of transmissions is not much left from the maximum number of transmissions of 1 TB. That is, for example, it is a case in which the difference between the maximum transmission number of the transport block and the current transmission number is less than or equal to a threshold.

In an embodiment, the sidelink DRX timers mentioned in some embodiments of the present disclosure (or related to some embodiments) are, for example, as follows.

Sidelink DRX Onduration Timer: the duration in which the UE performing sidelink DRX operation should basically operate in the active time/state in order to receive PSCCH/PSSCH of the other UE.

Sidelink DRX Inactivity Timer: the duration extending the sidelink DRX onduration duration, which is the duration in which the UE performing sidelink DRX operation should basically operate in the active time/state in order to receive PSCCH/PSSCH of the other UE. That is, the Sidelink DRX Onduration Timer may be extended as much as the Sidelink DRX Inactivity Timer duration. Also, if the UE receives a new packet (transmission of new PSSCH) from the other UE, the UE may start the Sidelink DRX Inactivity Timer to extend the Sidelink DRX Onduration timer.

Sidelink DRX HARQ RTT Timer: the duration in which the UE performing sidelink DRX operation operates in the sleep mode until the UE receives a retransmission packet (or PSSCH allocation) transmitted by the other UE. That is, if the UE starts the Sidelink DRX HARQ RTT Timer, the UE may determine that the other UE will not transmit a sidelink retransmission packet to the UE until the Sidelink DRX HARQ RTT Timer expires, and the UE may operate in the sleep mode during the corresponding timer.

Sidelink DRX Retransmission Timer: the duration in which the UE performing sidelink DRX operation operates in the active time/state to receive a retransmission packet (or PSSCH allocation) transmitted by the other UE. During the corresponding timer duration, the UE may monitor the reception of a retransmission sidelink packet (or PSSCH allocation) transmitted by the other UE.

In the above description, the names of the timers (Uu DRX HARQ RTT TimerSL, Uu DRX Retransmission TimerSL, Sidelink DRX Onduration Timer, Sidelink DRX Inactivity Timer, Sidelink DRX HARQ RTT Timer, Sidelink DRX Retransmission Timer, etc.) are only exemplary, and a timer performing the same/similar function based on the contents described in each timer may be regarded as the same/similar timer regardless of its name.

In an embodiment, the proposal of the present disclosure can be applied/extended to/as a method of solving a problem in which loss occurs due to interruption which occurs during Uu BWP switching.

In addition, in the case of a plurality of SL BWPs being supported for the UE, the proposal of the present disclosure can be applied/extended to/as a method of solving a problem in which loss occurs due to interruption which occurs during SL BWP switching.

The proposal of the present disclosure can be applied/extended to/as UE-pair specific SL DRX configuration(s). UE-pair specific SL DRX pattern(s) or parameter(s) (and timer(s)) included in UE-pair specific SL DRX configuration(s), as well as default/common SL DRX configuration(s), default/common SL DRX pattern(s), or parameter(s) (and timer(s)) included in default/common SL DRX configuration(s). In addition, the on-duration mentioned in the proposal of the present disclosure may be extended to or interpreted as an active time (time to wake-up state (RF module turned on) to receive/transmit radio signal(s)) duration, and the off-duration may be extended to or interpreted as a sleep time (time to sleep in sleep mode state (RF module turned off) to save power) duration. It does not mean that the TX UE is obligated to operate in the sleep mode in the sleep time duration. If necessary, the TX UE may be allowed to operate in an active time for a while for a sensing operation and/or a transmission operation, even if it is a sleep time. In addition, whether or not the (some) proposed method/rule of the present disclosure is applied and/or related parameter(s) (e.g., threshold value(s)) may be configured specifically (or differently or independently) for each resource pool, for each congestion level, for each service priority (and/or type), for each QoS requirement (e.g., latency, reliability), for each PQI (5G QoS identifier (5QI) for PC5), for each traffic type (e.g., periodic generation or aperiodic generation), for each SL transmission resource allocation mode (mode 1 or mode 2), etc.

For example, whether or not the proposed rule of the present disclosure is applied (and/or related parameter configuration value(s)) may be configured specifically (and/or differently and/or independently) for each resource pool, for each service/packet type (and/or priority), for each QoS requirement (e.g., URLLC/EMBB traffic, reliability, latency), for each PQI, for each cast type (e.g., unicast, groupcast, broadcast), for each (resource pool) congestion level (e.g., CBR), for each SL HARQ feedback option (e.g., NACK-only feedback, ACK/NACK feedback), according to whether HARQ Feedback Enabled MAC PDU is transmitted or not (and/or HARQ Feedback Disabled MAC PDU is transmitted or not), according to whether a PUCCH-based SL HARQ feedback reporting operation is configured or not, according to whether pre-emption (or pre-emption-based resource reselection) (and/or re-evaluation (or re-evaluation-based resource reselection)) is performed or not, for each (L2 or L1)(source and/or destination) identifier, for each (L2 or L1) (a combination of source layer ID and destination layer ID) identifier, for each (L2 or L1) (a combination of a pair of source layer ID and destination layer ID and a cast type) identifier, for each direction of a pair of source layer ID and destination layer ID, for each PC5 RRC connection/link, for the case of performing SL DRX, for each SL mode type (e.g., resource allocation mode 1 or resource allocation mode 2), and/or for the case of performing (a) periodic resource reservation.

The certain time mentioned in the proposal of the present disclosure may refer to a time during which a UE operates in an active time for a pre-defined time in order to receive sidelink signal(s) or sidelink data from a counterpart UE, or may refer to a time during which a UE operates in an active time as long as a specific timer (sidelink DRX retransmission timer, sidelink DRX inactivity timer, or timer to ensure that an RX UE can operate in an active time in a DRX operation of the RX UE) is running in order to receive sidelink signal(s) or sidelink data from a counterpart UE.

In addition, the proposal and whether or not the proposal rule of the present disclosure is applied (and/or related parameter configuration value(s)) may also be applied to a mmWave SL operation.

Based on various embodiments of the present disclosure, if the TX UE operating based on sidelink DRX satisfies the condition for determining that transmission and reception of sidelink data is necessary even if its sidelink DRX onduration period is expired, the TX UE may not transit to the sleep mode and keep the active mode such that sidelink transmission can be continued. In addition, if the condition for determining that transmission and reception of sidelink data is not necessary is satisfied, the TX UE may transit to the sleep mode to reduce power consumption.

Various embodiments of the present disclosure may be combined with a synchronization operation of the UE and/or the SL HARQ feedback operation of the UE.

Meanwhile, in some embodiments according to the present disclosure below, a method in which the RX UE receives a transport block for sidelink communication from the TX UE and performs a power saving operation according to the state of HARQ feedback (HARQ ACK, HARQ NACK, HARQ DTX) for the received transport block (TB) in NR V2X is proposed.

Table 8 below shows another example of the sidelink DRX configuration.

TABLE 8

Sidelink DRX configurations

SL drx-onDurationTimer: the duration at the beginning of a DRX Cycle;
SL drx-SlotOffset: the delay before starting the drx-onDurationTimer;
SL drx-InactivityTimer: the duration after the PSCCH occasion in which a PSCCH indicates a new SL transmission for the MAC entity;
SL dtx-RetransmissionTimer-RX (per HARQ process): the maximum duration until PSCCH (Sidelink Control Information) & PSSCH for SL HARQ retransmission is received;
SL drx-LongCycleStartOffset: the Long DRX cycle and drx-StartOffset which defines the subframe where the Long and Short DRX Cycle starts;
SL drx-ShortCycle (optional): the Short DRX cycle;
SL drx-ShortCycleTimer (optional): the duration the UE shall follow the Short DRX cycle;
SL drx-HARQ-RTT-Timer-RX (per HARQ process): the minimum duration before PSCCH (Sidelink Control Information) & PSSCH for SL HARQ retransmission is expected by the RX UE's MAC entity.

Referring to Table 8, SL drx-RetransmissionTimer-RX according to an embodiment may represent the maximum time duration until PSCCH (sidelink control information) and PSSCH for SL HARQ retransmission is received. For example, SL drx-RetransmissionTimer-RX may be defined as a time for the RX UE to monitor PSCCH and/or PSSCH to receive SL HARQ retransmission transmitted by the TX UE. If the SL drx-HARQ-RTT-Timer-RX timer expires, the RX UE may transit to the active state and start the SL drx-RetransmissionTimer-RX timer to receive PSCCH and/or PSSCH for SL HARQ retransmission transmitted by the TX UE. If SL HARQ retransmission transmitted by the TX UE is received while the SL drx-RetransmissionTimer-RX timer is running, the RX UE may stop the SL drx-RetransmissionTimer-RX timer.

Referring to Table 8, SL drx-HARQ-RTT-Timer-RX according to an embodiment may represent the minimum time duration before PSCCH (sidelink control information) and/or PSSCH for SL HARQ retransmission is expected by the MAC entity of the RX UE. For example, SL drx-HARQ-RTT-Timer-RX may be defined as a minimum time required to monitor PSCCH and/or PSSCH for a sidelink HARQ retransmission packet transmitted by the TX UE if the MAC entity of the RX UE receives and successfully decodes PSCCH (sidelink control information) transmitted by the TX UE and fails to decode the received PSSCH (sidelink data) and transmits HARQ NACK to the TX UE. That is, it may mean that PSCCH and/or PSSCH for SL HARQ retransmission is not transmitted from the TX UE before SL drx-HARQ-RTT-Timer-RX expires. The RX UE may operate in the sleep mode while SL drx-HARQ-RTT-Timer-RX is running, and if SL drx-HARQ-RTT-Timer-RX expires, the RX UE may transit to the active state and start the SL drx-RetransmissionTimer-RX timer.

In embodiment(s) below, a method of saving power based on the operations of SL drx-HARQ-RTT-Timer-RX and SL drx-retransmissionTimer-RX of the RX UE performing sidelink communication may be provided.

In an embodiment, with respect to the operation of SL drx-HARQ-RTT-Timer-RX and SL drx-retransmission-Timer-RX of the RX UE, the TX UE may transmit an SL packet to the RX UE by using blind retransmission in a HARQ feedback disabled mode. In this case, since the RX UE does not transmit SL HARQ feedback, the RX UE may not be able to operate the RTT/retransmission timer based on PSFCH transmission as in HARQ feedback enabled. Therefore, if the RX UE receives PSSCH transmitted by the TX UE, the RX UE needs to start the retransmission timer to ensure that the RX UE receives blind retransmission (including additional transmissions) packet(s) transmitted by the TX UE.

In an embodiment, the inactivity timer and the HARQ RTT timer and/or the retransmission timer may each independently operate. The inactivity timer is a common DRX timer, and upon receiving a new TB from the TX UE, the RX UE may start the inactivity timer and monitor whether there is additional SL data transmitted by the TX UE. If the RX UE receives PSSCH (new TB) transmitted by the TX UE and starts the inactivity timer, and if HARQ NACK occurs at the same time, the RX UE may start the HARQ RTT timer/retransmission timer independently of the inactivity timer. Meanwhile, the SL HARQ RTT timer/retransmission timer may be a timer operated per a sidelink process or per a HARQ process. Therefore, the TX UE and the RX UE may operate according to the following process. i) The TX UE may transmit PSSCH (new TB) to the RX UE (e.g., HARQ disabled). ii) The RX UE may start the SL DRX inactivity timer based on the reception of the PSSCH and monitor new additional PSSCH. iii) The RX UE may start the HARQ RTT/retransmission timer and monitor blind retransmission packet(s). iv) The TX UE may transmit new PSSCH (new TB). v) The TX UE may transmit blind retransmission packet(s) for the i) to the RX UE. vi) The TX UE may transmit blind retransmission packet(s) for the i) to the RX UE. Thereafter, the inactivity timer may be started and then expired/terminated, and after that, the HARQ RTT/retransmission timer may be started and then expired/terminated.

In embodiment(s) below of the present disclosure, the sidelink DRX operation of the RX UE and/or the operation of the RX UE receiving the sidelink HARQ retransmission are described.

In an embodiment (or in a tenth embodiment), if the RX UE successfully decodes PSCCH (Sidelink Control Information) transmitted by the TX UE, but fails to decode PSSCH and transmits HARQ NACK to the TX UE, the RX UE may start the sidelink HARQ-RTT-Timer-RX timer and transit to the sleep mode. If the SL drx-HARQ-RTT-Timer-RX timer expires, the RX UE may start the SL drx-RetransmissionTimer-RX timer by transiting to the active mode to receive PSCCH and PSSCH for a SL HARQ retransmission packet transmitted by the TX UE, and the RX UE may receive PSCCH and PSSCH transmitted by the TX UE. If the RX UE receives PSCCH and PSSCH for SL HARQ retransmission transmitted by the TX UE, the RX UE may stop the SL drx-RetransmissionTimer-RX timer. If the RX UE receives PSCCH and PSSCH for SL HARQ retransmission transmitted by the TX UE, but the decoding of the PSSCH fails (PSCCH decoding succeeds, PSSCH decoding fails) again and transmits HARQ NACK to the TX UE, the RX UE may restart the Sidelink HARQ-RTT-Timer-RX timer and transit to the sleep mode until Sidelink HARQ-RTT-Timer-RX expires. If the Sidelink HARQ-RTT-Timer-RX timer expires, the RX UE may transit to the active state again to receive PSCCH and PSSCH for SL HARQ retransmission retransmitted by the TX UE, and the RX UE may start the SL drx-RetransmissionTimer-RX timer. If the RX UE receives PSCCH and PSSCH for SL HARQ retransmission transmitted by the TX UE, the RX UE may stop SL drx-RetransmissionTimer.

In an embodiment (or in an eleventh embodiment), if the TX UE transmits PSCCH (SCI) to the RX UE by setting the HARQ feedback option to HARQ Feedback Disable (even if PSSCH decoding fails, HARQ NACK is not transmitted to the TX UE. The TX UE performs retransmission with blind retransmission), the RX UE may perform the operation for the sidelink DRX and the reception of sidelink HARQ retransmission as follows. That is, if the RX UE successfully decodes SCI transmitted by the TX UE, but fails to decode PSSCH, the RX UE may receive a sidelink retransmission packet transmitted by the TX UE through blind retransmission without transmitting HARQ NACK feedback to the TX UE. Therefore, if the RX UE successfully decodes SCI (including information indicating HARQ feedback Disabled) transmitted by the TX UE, but fails to decode PSSCH, the RX UE may start the sidelink HARQ-RTT-Timer-RX timer and transit to the sleep mode. That is, the RX UE may determine that the TX UE does not perform blind retransmission until the SL drx-HARQ-RTT-Timer-RX timer expires and may transit to the sleep mode. If the SL drx-HARQ-RTT-Timer-RX timer expires, the RX UE may start SL drx-RetransmissionTimer-RX by transiting to the active mode to receive a packet retransmitted by the TX UE with blind retransmission, and the RX UE may receive the retransmission packet transmitted by the TX UE. If the RX UE receives PSCCH and PSSCH transmitted by the TX UE with blind retransmission, the RX UE may stop the SL drx-RetransmissionTimer-RX timer. If the RX UE fails again to decode PSSCH transmitted by the TX UE with blind retransmission (decoding for PSCCH indicating HARQ feedback Disabled succeeds, PSSCH decoding fails), the RX UE may restart the sidelink HARQ-RTT-Timer-RX timer and operate in the sleep mode while the timer is running. If the sidelink HARQ-RTT-Timer-RX timer expires, the RX UE may start SL drx-Retransmission-Timer-RX again by transiting to the active state to receive PSCCH and PSSCH retransmitted by the TX UE with blind retransmission. If the RX UE receives PSCCH and PSSCH transmitted by the TX UE with blind retransmission, the RX UE may stop SL drx-RetransmissionTimer.

In an embodiment (or in a twelfth embodiment), if the TX UE transmits PSCCH (SCI) to the RX UE by setting the HARQ feedback option to HARQ feedback disable (The RX UE does not transmit HARQ ACK to the TX UE even if PSSCH decoding succeeds. The TX UE performs retransmission with blind retransmission. The RX UE receives retransmission packet(s) that the TX UE blindly retransmits), the RX UE may perform the operation of the sidelink DRX and the reception of sidelink HARQ retransmission. That is, if the RX UE successfully decodes PSCCH (SCI) transmitted by the TX UE and also succeeds in decoding PSSCH, the RX UE may not transmit HARQ ACK feedback to the TX UE. In addition, the RX UE may receive retransmission packet(s) transmitted by the TX UE with blind retransmission. Therefore, even if the RX UE successfully decodes SCI (including information indicating HARQ feedback Disabled) transmitted by the TX UE and also succeeds in decoding PSSCH, and if the RX UE is instructed through PSCCH (e.g., sidelink control information) that the HARQ feedback option is HARQ feedback Disabled, the RX UE which successfully receives PSCCH and PSSCH may start the sidelink HARQ-RTT-Timer-RX timer and transit to the sleep mode. If the SL drx-HARQ-RTT-Timer-RX timer expires, the RX UE may start the SL drx-Retransmission-Timer-RX timer by transiting to the active mode to receive PSCCH and PSSCH for packet(s) retransmitted by the TX UE with blind retransmission, and the RX UE may receive PSCCH and PSSCH for sidelink blind retransmission transmitted by the TX UE. If the RX UE receives PSCCH and PSSCH for blind retransmission transmitted by the TX UE, the RX UE may stop SL drx-RetransmissionTimer-RX. In addition, when decoding of the blind retransmission packet transmitted by the TX UE succeeds or fails (decoding for PSCCH including information indicating HARQ feedback Disabled succeeds, PSSCH decoding fails), the RX UE may start the Sidelink HARQ-RTT-Timer-RX timer and operate in the sleep mode until the RX UE monitors PSCCH and PSSCH for the next blind retransmission. If the sidelink HARQ-RTT-Timer-RX timer expires, the RX UE transit to the active mode to receive PSCCH and PSSCH retransmitted by the TX UE with blind retransmission, and the RX UE may start the SL drx-RetransmissionTimer-RX timer.

In an embodiment (or in a thirteenth embodiment), regardless of whether the RX UE succeeds or fails decoding for PSSCH (sidelink data) transmitted by the TX UE, if the RX UE successfully decodes PSCCH (sidelink control information), the RX UE may start the sidelink HARQ-RTT-Timer-RX timer and transit to the sleep mode. If the SL drx-HARQ-RTT-Timer-RX timer expires, the RX UE may start the SL drx-RetransmissionTimer-RX timer by transiting to the active mode to receive PSCCH and PSSCH for SL HARQ retransmission packet(s) transmitted by the TX UE, and the RX UE may receive PSCCH and PSSCH transmitted by the TX UE. If the RX UE receives PSCCH and PSSCH for SL HARQ retransmission transmitted by the TX UE, the RX UE may stop the SL drx-RetransmissionTimer-RX timer. If the RX UE succeeds in decoding PSCCH for SL HARQ retransmission transmitted by the TX UE, the RX UE may restart the sidelink HARQ-RTT-Timer-RX timer and transit to the sleep mode until the sidelink HARQ-RTT-Timer-RX timer expires. If the sidelink HARQ-RTT-Timer-RX timer expires, the RX UE may start the SL drx-RetransmissionTimer-RX timer again by transiting to the active state to receive PSCCH and PSSCH for SL HARQ retransmission retransmitted by the TX UE. If the RX UE receives PSCCH and PSSCH for SL HARQ retransmission transmitted by the TX UE, and the RX UE may stop SL drx-RetransmissionTimer.

In an embodiment (or in a fourteenth embodiment), if the RX UE succeeds in decoding PSCCH (SCI) transmitted by the TX UE and fails to decode PSSCH (SL data), the RX UE should transmit SL HARQ NACK to the TX UE. However, if transmission is not possible due to the following reasons, the RX UE may start the sidelink HARQ-RTT-Timer-RX timer and transit to the sleep mode (Even if SL HARQ NACK is not transmitted to the TX UE, the RX UE should start the sidelink HARQ-RTT-Timer-RX timer because the TX UE can transmit SL HARQ retransmission packet(s) to the RX UE).

(Reason) If the RX UE also has SL data (e.g., SL HARQ feedback) to be transmitted to the other UE and UL data to be transmitted to the base station occurs at the same time, the RX UE may compare priorities of the SL data and the UL data, and the RX UE may transmit high-priority data first. If the priority of UL data is high in priority comparison, there may be a problem in that SL HARQ feedback cannot be transmitted to the TX UE and UL data should be transmitted to the base station.

If the SL drx-HARQ-RTT-Timer-RX timer expires, the RX UE may start the SL drx-RetransmissionTimer-RX timer by transiting to the active mode to receive PSCCH and PSSCH for SL HARQ retransmission packet(s) transmitted by the TX UE, and the RX UE may receive PSCCH and PSSCH transmitted by the TX UE. If the RX UE receives PSCCH and PSSCH for SL HARQ retransmission transmitted by the TX UE, the RX UE may stop the SL drx-RetransmissionTimer-RX timer. If the RX UE receives PSCCH and PSSCH for SL HARQ retransmission from the TX UE, but fails to decode PSSCH again and transmits HARQ NACK to the TX UE (decoding for PSCCH succeeds, decoding for PSSCH fails), the RX UE may restart the sidelink HARQ-RTT-Timer-RX timer and transit to the sleep mode until the sidelink HARQ-RTT-Timer-RX timer expires. If the sidelink HARQ-RTT-Timer-RX timer expires, the RX UE may start the SL drx-RetransmissionTimer-RX timer again by transiting to the active state to receive PSCCH and PSSCH for SL HARQ retransmission retransmitted by the TX UE. If the RX UE receives PSCCH and PSSCH for SL HARQ retransmission transmitted by the TX UE, the RX UE may stop SL drx-RetransmissionTimer.

Figure 15:
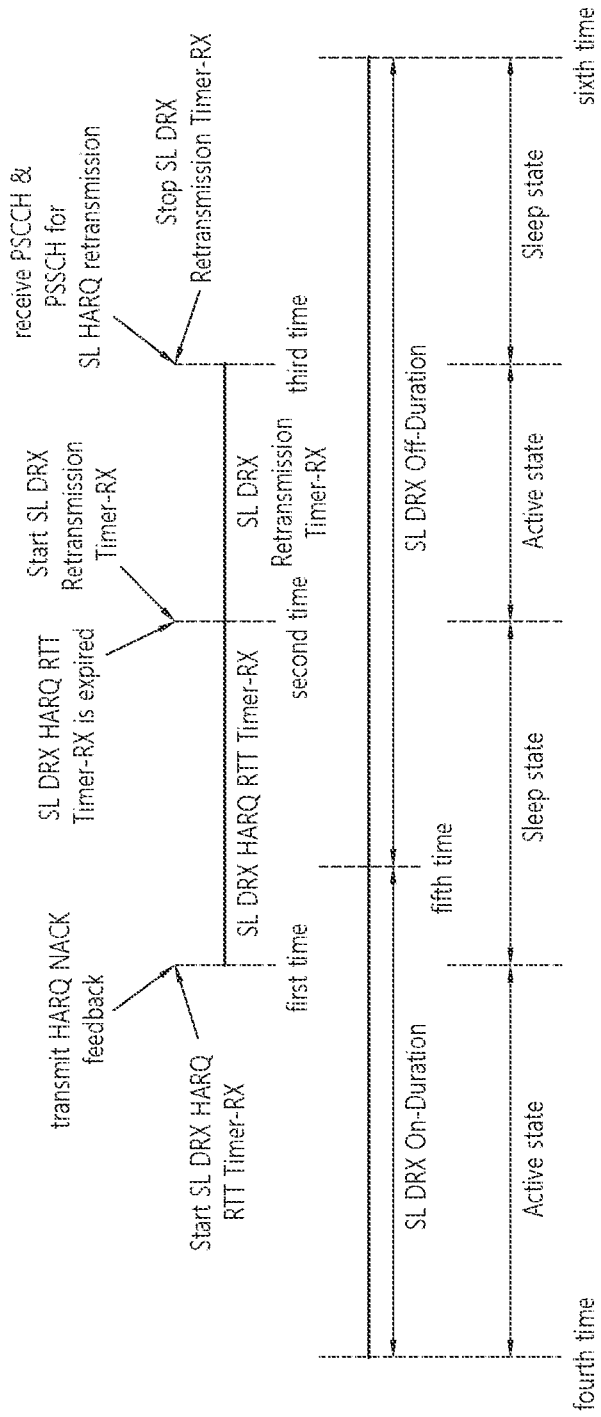
FIG. 15 shows an example of a method for an RX UE to save power consumption for sidelink communication based on an embodiment.

FIG. 15 shows an example of a method for an RX UE to save power consumption for sidelink communication based on an embodiment.

More specifically, FIG. 15 shows an embodiment of a method for an RX UE to save power based on the RX SL HARQ RTT Timer-RX operation and the SL DRX retransmission timer-RX operation, which is proposed by the embodiment(s) of the present disclosure.

As shown in FIG. 15, if the RX UE successfully decodes PSCCH (sidelink control information) transmitted by the TX UE, but fails to decode PSSCH and transmits HARQ NACK to the TX UE, the RX UE may start the sidelink HARQ-RTT-Timer-RX timer and transit to the sleep mode. If the SL drx-HARQ-RTT-Timer-RX timer expires, the RX UE may start the SL drx-RetransmissionTimer-RX timer by transiting to the active mode to receive PSCCH and PSSCH for SL HARQ retransmission packet(s) transmitted by the TX UE, and the RX UE may receive PSCCH and PSSCH transmitted by the TX UE. If the RX UE receives PSCCH and PSSCH for SL HARQ retransmission transmitted by the TX UE, the RX UE may stop the SL drx-RetransmissionTimer-RX timer.

According to some of various embodiments of the present disclosure, a method for the RX UE operating in sidelink DRX to efficiently receive PSCCH and PSSCH for sidelink HARQ retransmission transmitted by the TX UE based on switching between the sleep mode and the active mode is provided. That is, it is possible to ensure that the RX UE receives PSCCH and PSSCH transmitted by the TX UE while operating in the power saving mode.

Various embodiments of the present disclosure may be combined with at least one of the power control operation of the UE, the congestion control operation of the UE, the channel coding operation of the UE, and/or the SL HARQ feedback operation of the UE.

Figure 16:
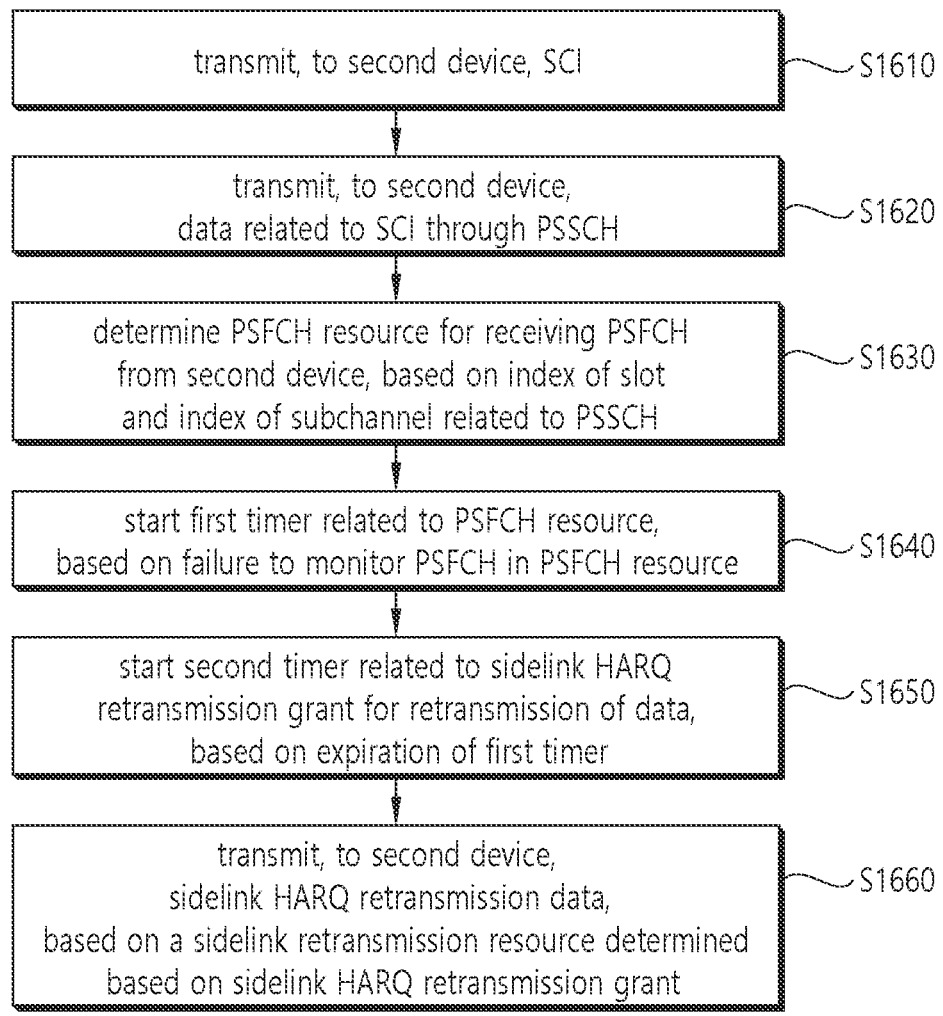
FIG. 16 shows a method for a first device to perform sidelink communication with a second device based on an embodiment of the present disclosure.

FIG. 16 shows a method for a first device to perform sidelink communication with a second device based on an embodiment of the present disclosure.

The operations disclosed in the flowchart of FIG. 16 may be performed in combination with various embodiments of the present disclosure. In an embodiment, the operations disclosed in the flowchart of FIG. 16 may be performed based on at least one of the devices illustrated in FIGS. 18 to 23. In an embodiment, the first device of FIG. 16 may correspond to the first wireless device 100 of FIG. 19 to be described later, and the second device of FIG. 16 may correspond to the second wireless device 200 of FIG. 19 to be described later. In another embodiment, the first device of FIG. 16 may correspond to the second wireless device 200 of FIG. 19 to be described later, and the second device of FIG. 16 may correspond to the first wireless device 100 to be described later.

In step S1610, the first device according to an embodiment may transmit sidelink control information (SCI) to the second device.

In step S1620, the first device according to an embodiment may transmit, to the second device, data related to the SCI through a physical sidelink shared channel (PSSCH).

In step S1630, the first device according to an embodiment may determine a physical sidelink feedback channel (PSFCH) resource for receiving a PSFCH from the second UE, based on an index of a slot and an index of a subchannel related to the PSSCH.

In step S1640, the first device according to an embodiment may start a first timer related to the PSFCH resource, based on a failure to monitor the PSFCH in the PSFCH resource.

In another embodiment, the first timer may be a timer related to an SL grant received from a base station through a PDCCH. For example, the first timer may be a timer for a time in which the first device is not expected to receive the SL grant from the base station.

In step S1650, the first device according to an embodiment starts a second timer related to a sidelink HARQ retransmission grant for retransmission of the data, based on an expiration of the first timer.

In another embodiment, the second timer may be a timer related to the duration in which the first device performs sidelink HARQ retransmission to the second device. Alternatively, the second timer may be a timer for a time during which the first device expects to receive the SL grant from the base station.

In step S1660, the first device according to an embodiment may transmit sidelink HARQ retransmission data to the second device based on a sidelink retransmission resource determined based on the sidelink HARQ retransmission grant.

In an embodiment, the first timer may correspond/same/similar to the above-described SL drx-HARQ-RTT-Timer-TX, and the second timer may correspond/same/similar to the above-described SL drx-RetransmissionTimer-TX.

In an embodiment, the sidelink HARQ retransmission grant may be received from the base station after the second timer is started.

In an embodiment, the second timer may be stopped after the sidelink HARQ retransmission data is transmitted to the second device.

In an embodiment, monitoring for the PSFCH may fail due to the transmission of the first device performed in a time domain overlapping the PSFCH resource.

In an embodiment, based on that the number of occurrences of sidelink hybrid automatic repeat request (HARQ) discontinuous transmission (DTX) reaches a maximum threshold by failing to receive sidelink HARQ feedback from the second device through the PSFCH resource, the first timer may not be started or may be stopped.

In one embodiment, based on that the number of HACK negative acknowledgment (NACK) receptions reaches a maximum threshold by receiving HARQ NACK representing that the PSSCH is not decoded by the second device through the PSFCH resource from the second device, the first timer may not be started or may be stopped.

In an embodiment, based on that the difference between a maximum available transmission number and a current transmission number of a transport block for the PSSCH is less than or equal to a threshold by transmitting the PSSCH to the second device, and based on no PUCCH resource for transmitting a physical uplink control channel (PUCCH) to the base station, the first timer may not be started or may be stopped.

In an embodiment, based on a mode for sidelink communication of the first device being switched from a mode 1 in which sidelink communication is performed based on resource configuration information received from the base station to a mode 2 in which sidelink communication is performed based on sensing of the first device performed in a resource pool, the first timer may not be started or may be stopped.

In an embodiment, starting the first timer may comprise: starting the first timer, based on the failure to monitor the PSFCH in the PSFCH resource and transmission of a PUCCH to the base station through a PUCCH resource configured from the base station. In this case, HARQ NACK representing that the PSSCH is not decoded by the second device may be transmitted from the first device to the base station through the PUCCH.

In an embodiment, starting the first timer may comprise: starting the first timer, based on the failure to monitor the PSFCH in the PSFCH resource and no PUCCH resource configured from the base station.

In an embodiment, the expiration time of the first timer may be earlier than the earliest time when the sidelink HARQ retransmission grant is expected to be received from the base station.

In an embodiment, the sidelink HARQ retransmission grant may be transmitted from the base station to the first device through a physical downlink control channel (PDCCH). PDCCH monitoring for receiving the PDCCH from the base station may not be performed for a time during which the first timer is running.

In an embodiment, the PDCCH monitoring for receiving the PDCCH from the base station may be performed for a time during which the second timer is running.

In an embodiment, the first device may be in a discontinuous reception (DRX) active state, which is allowed to receive a signal from the base station, in the time during which the second timer is running.

In an embodiment, in case the first device (or TX UE) misses PSFCH (due to the half-duplex problem), the mode 1 DCI monitoring (Uu DRX RTT/Retransmission timer) operation may be proposed. The half-duplex problem refers to a case in which PSFCH monitoring cannot be performed due to a problem that occurs because the UE cannot transmit and receive at the same time. In this case, in an embodiment, the condition(s) for stopping or not starting the timer may be as follows: i) if DTX reaches the maximum threshold, ii) if HARQ NACK is received as much as the maximum threshold, iii) if the maximum number of transmissions reaches the threshold and there is no PUCCH resource, iv) if switching to the mode 2, etc.

In another embodiment, the half-duplex problem may correspond to the start condition of the timer.

In an embodiment, the TX UE may start the HARQ RTT timer/retransmission timer at the start of transmission of sidelink data (SL TB).

In an embodiment, in case of HARQ Feedback Disabled MAC PDU transmission (blind transmission), the TX UE may start the HARQ RTT timer/retransmission timer when starting transmission of sidelink data (SL TB).

In an embodiment, in case of HARQ feedback Disabled MAC PDU transmission, Uu DRX operation may be as follows. In an embodiment, if PUCCH (resource) is configured, i) the HARQ RTT timer may be started regardless of whether HARQ ACK is transmitted to the base station or NACK is transmitted through PUCCH, and ii) the retransmission timer may be started only if HARQ NACK is transmitted through PUCCH. And/or, the retransmission timer may be started only if NACK is received from the RX UE through PSFCH (i.e., HARQ feedback Enabled MAC PDU).

In another embodiment, if PUCCH (resource) is not configured, the TX UE may start the timer (for mode 1 PDCCH monitoring) when starting transmission of sidelink data (SL TB).

In another embodiment, with respect to HARQ feedback DISABLED MAC PDU, after PUCCH transmission with SL HARQ feedback information, MODE 1 DCI monitoring related RTT/retransmission timer may be started. For example, the TX UE may start the RTT TIMER based on the PUCCH resource, and the TX UE may start the retransmission timer after the RTT timer expires. For example, the retransmission timer (and/or RTT timer) may be started based on the start time of the TB-related scheduled MODE 1 resource.

In an embodiment, Uu DRX operation may be provided if the TX UE misses monitoring for the PSFCH. In an embodiment, even if the TX UE fails to perform the PSFCH monitoring, the timer (RTT/Retransmission timer) for monitoring the retransmission grant of the base station may operate. In another embodiment, even if the TX UE fails to monitor the PSFCH, if PUCCH is configured, the TX UE may transmit SL HARQ NACK and operate the timer (RTT/Retransmission timer) for monitoring the retransmission grant of the base station. In another embodiment, even if the TX UE fails to monitor the PSFCH, if PUCCH is not configured, the TX UE may operate the timer (RTT/Retransmission timer) for monitoring the retransmission grant of the base station from the time when PSFCH monitoring should be performed.

Based on an embodiment of the present disclosure, a first device adapted to perform sidelink communication may be provided. The first device may comprise: at least one memory storing instructions; at least one transceiver; and at least one processor connected to the at least one memory and the at least one transceiver. The at least one processor may execute the instructions to: control the at least one transceiver to transmit, to a second device, sidelink control information (SCI); control the at least one transceiver to transmit, to the second device, data related to the SCI through a physical sidelink shared channel (PSSCH); determine a physical sidelink feedback channel (PSFCH) resource for receiving a PSFCH from the second device, based on an index of a slot and an index of a subchannel related to the PSSCH; start a first timer related to the PSFCH resource, based on a failure to monitor the PSFCH in the PSFCH resource; start a second timer related to a sidelink HARQ retransmission grant for retransmission of the data, based on an expiration of the first timer; and control the at least one transceiver to transmit, to the second device, sidelink HARQ retransmission data, based on a sidelink retransmission resource determined based on the sidelink HARQ retransmission grant, wherein the sidelink HARQ retransmission grant is received from a base station after the second timer is started, and wherein the second timer is stopped after the sidelink HARQ retransmission data is transmitted to the second device.

Based on an embodiment of the present disclosure, a device adapted to control a first user equipment (UE) may be provided. The device may comprise: at least one processor;

and at least one memory connected to the at least one processor and storing instructions. The at least one processor may execute the instructions to: transmit, to a second UE, sidelink control information (SCI); transmit, to the second UE, data related to the SCI through a physical sidelink shared channel (PSSCH); determine a physical sidelink feedback channel (PSFCH) resource for receiving a PSFCH from the second UE, based on an index of a slot and an index of a subchannel related to the PSSCH; start a first timer related to the PSFCH resource, based on a failure to monitor the PSFCH in the PSFCH resource; start a second timer related to a sidelink HARQ retransmission grant for retransmission of the data, based on an expiration of the first timer; and transmit, to the second UE, sidelink HARQ retransmission data, based on a sidelink retransmission resource determined based on the sidelink HARQ retransmission grant, wherein the sidelink HARQ retransmission grant is received from a base station after the second timer is started, and wherein the second timer is stopped after the sidelink HARQ retransmission data is transmitted to the second UE.

In an embodiment, the first UE of the embodiment may refer to the first device described throughout the present disclosure. In an embodiment, the at least one processor, the at least one memory and the like in the device for controlling the first UE may be implemented as separate sub-chips, respectively, alternatively, at least two or more components may be implemented through one sub-chip.

Based on an embodiment of the present disclosure, a non-transitory computer-readable storage medium storing instructions (or commands) may be provided. The instructions, when executed, may cause a first device to: transmit, to a second device, sidelink control information (SCI); transmit, to the second device, data related to the SCI through a physical sidelink shared channel (PSSCH); determine a physical sidelink feedback channel (PSFCH) resource for receiving a PSFCH from the second device, based on an index of a slot and an index of a subchannel related to the PSSCH; start a first timer related to the PSFCH resource, based on a failure to monitor the PSFCH in the PSFCH resource; start a second timer related to a sidelink HARQ retransmission grant for retransmission of the data, based on an expiration of the first timer; and transmit, to the second device, sidelink HARQ retransmission data, based on a sidelink retransmission resource determined based on the sidelink HARQ retransmission grant, wherein the sidelink HARQ retransmission grant is received from a base station after the second timer is started, and wherein the second timer is stopped after the sidelink HARQ retransmission data is transmitted to the second device.

Figure 17:
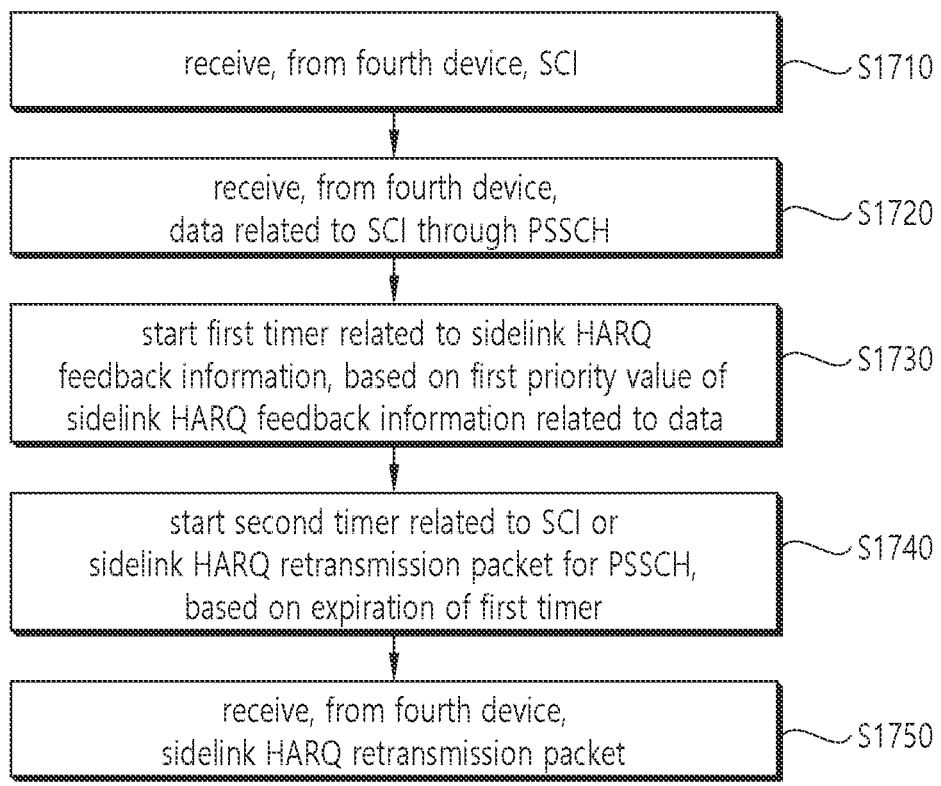
FIG. 17 shows a method for a third device to perform sidelink communication with a fourth device based on an embodiment of the present disclosure.

FIG. 17 shows a method for a third device to perform sidelink communication with a fourth device based on an embodiment of the present disclosure.

The operations disclosed in the flowchart of FIG. 17 may be performed in combination with various embodiments of the present disclosure. In an embodiment, the operations disclosed in the flowchart of FIG. 17 may be performed based on at least one of the devices illustrated in FIGS. 18 to 23. In an embodiment, the third device of FIG. 17 may correspond to the second wireless device 200 of FIG. 19 to be described later, and the fourth device of FIG. 17 may correspond to the first wireless device 100 of FIG. 19 to be described later. In another embodiment, the third device of FIG. 17 may correspond to the first wireless device 100 of FIG. 19 to be described later, and the fourth device of FIG. 17 may correspond to the second wireless device 200 of FIG. 19 to be described later.

In step S1710, the third device according to an embodiment may receive, from the fourth device, sidelink control information (SCI).

In step S1720, the third device according to an embodiment may receive, from the fourth device, data related to the SCI through a physical sidelink shared channel (PSSCH).

In step S1730, the third device according to an embodiment start a first timer related to sidelink hybrid automatic repeat request (HARQ) feedback information, based on a first priority value of the sidelink HARQ feedback information related to the data.

In step S1740, the third device according to an embodiment may start a second timer related to the SCI or a sidelink HARQ retransmission packet for the PSSCH, based on an expiration of the first timer.

In step S1750, the third device according to an embodiment may receive, from the fourth device, the sidelink HARQ retransmission packet.

In an embodiment, the sidelink HARQ retransmission packet may be received from the fourth device after the second timer is started.

In an embodiment, the first timer may correspond/same/similar to the above-described SL drx-HARQ-RTT-Timer-RX, and the second timer may correspond/same/similar to the above-described SL drx-RetransmissionTimer-RX.

In an embodiment, the second timer may be stopped after the sidelink HARQ retransmission packet is received from the fourth device.

In an embodiment, the first priority value of the sidelink HARQ feedback information may be greater than a second priority value related to uplink transmission to a base station.

In an embodiment, based on the first priority value being greater than the second priority value, the sidelink HARQ feedback information may not be transmitted to the fourth device.

In an embodiment, the sidelink HARQ feedback information may be HARQ acknowledgment (ACK) representing that the third device successfully decodes the data or HARQ NACK representing that the third device fails to decode the data.

In an embodiment, the RTT/retransmission timer operation (or SL DRX operation) due to PSFCH dropping (due to priority between SL and UL or priority between LTE SL and NR SL) of the third device (or RX UE) may be proposed. In an embodiment, in case of HARQ feedback Enabled MAC PDU, i) (in the case of successful decoding) even if the RX UE successfully receives SL data (decoding success), the TX UE may misjudgment as decoding failure because the RX UE does not actually transmit PSFCH. Thus, the RX UE should be able to monitor retransmission packet(s) of the TX UE by starting the RTT/Retransmission timer. ii) (in the case of decoding failure) if the RX UE fails to receive SL data (decoding failure), the TX UE may determine that decoding fails because the RX UE does not actually transmit PSFCH. Thus, the RX UE should be able to monitor retransmission packet(s) of the TX UE by starting the RTT/Retransmission timer.

In an embodiment, if the HARQ Feedback Disabled MAC PDU is transmitted by the TX UE, the SL DRX operation of RX UE may be provided. In an embodiment, if the RX UE receives SL data (decoding success or decoding failure), the RX UE may start the RTT/Retransmission timer to monitor the next HARQ feedback Disabled MAC PDU transmitted by the TX UE (with blind transmission).

Based on an embodiment of the present disclosure, a third device adapted to perform sidelink communication may be provided. The third device may comprise: at least one memory storing instructions; at least one transceiver; and at least one processor connected to the at least one memory and the at least one transceiver. The at least one processor may execute the instructions to: control the at least one transceiver to receive, from a fourth device, sidelink control information (SCI); control the at least one transceiver to receive, from the fourth device, data related to the SCI through a physical sidelink shared channel (PSSCH); start a first timer related to sidelink hybrid automatic repeat request (HARQ) feedback information, based on a first priority value of the sidelink HARQ feedback information related to the data; start a second timer related to the SCI or a sidelink HARQ retransmission packet for the PSSCH, based on an expiration of the first timer; and control the at least one transceiver to receive, from the fourth device, the sidelink HARQ retransmission packet, wherein the sidelink HARQ retransmission packet is received from the fourth device after the second timer is started, wherein the second timer is stopped after the sidelink HARQ retransmission packet is received from the fourth device, and wherein the first priority value of the sidelink HARQ feedback information is greater than a second priority value related to uplink transmission to a base station.

Various embodiments of the present disclosure may be independently implemented. Alternatively, the various embodiments of the present disclosure may be implemented by being combined or merged. For example, although the various embodiments of the present disclosure have been described based on the 3GPP LTE system for convenience of explanation, the various embodiments of the present disclosure may also be extendedly applied to another system other than the 3GPP LTE system. For example, the various embodiments of the present disclosure may also be used in an uplink or downlink case without being limited only to direct communication between UEs. In this case, a base station, a relay node, or the like may use the proposed method according to various embodiments of the present disclosure. For example, it may be defined that information on whether to apply the method according to various embodiments of the present disclosure is reported by the base station to the UE or by a transmitting UE to a receiving UE through pre-defined signaling (e.g., physical layer signaling or higher layer signaling). For example, it may be defined that information on a rule according to various embodiments of the present disclosure is reported by the base station to the UE or by a transmitting UE to a receiving UE through pre-defined signaling (e.g., physical layer signaling or higher layer signaling). For example, some embodiments among various embodiments of the present disclosure may be applied limitedly only to a resource allocation mode 1. For example, some embodiments among various embodiments of the present disclosure may be applied limitedly only to a resource allocation mode 2.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 18:
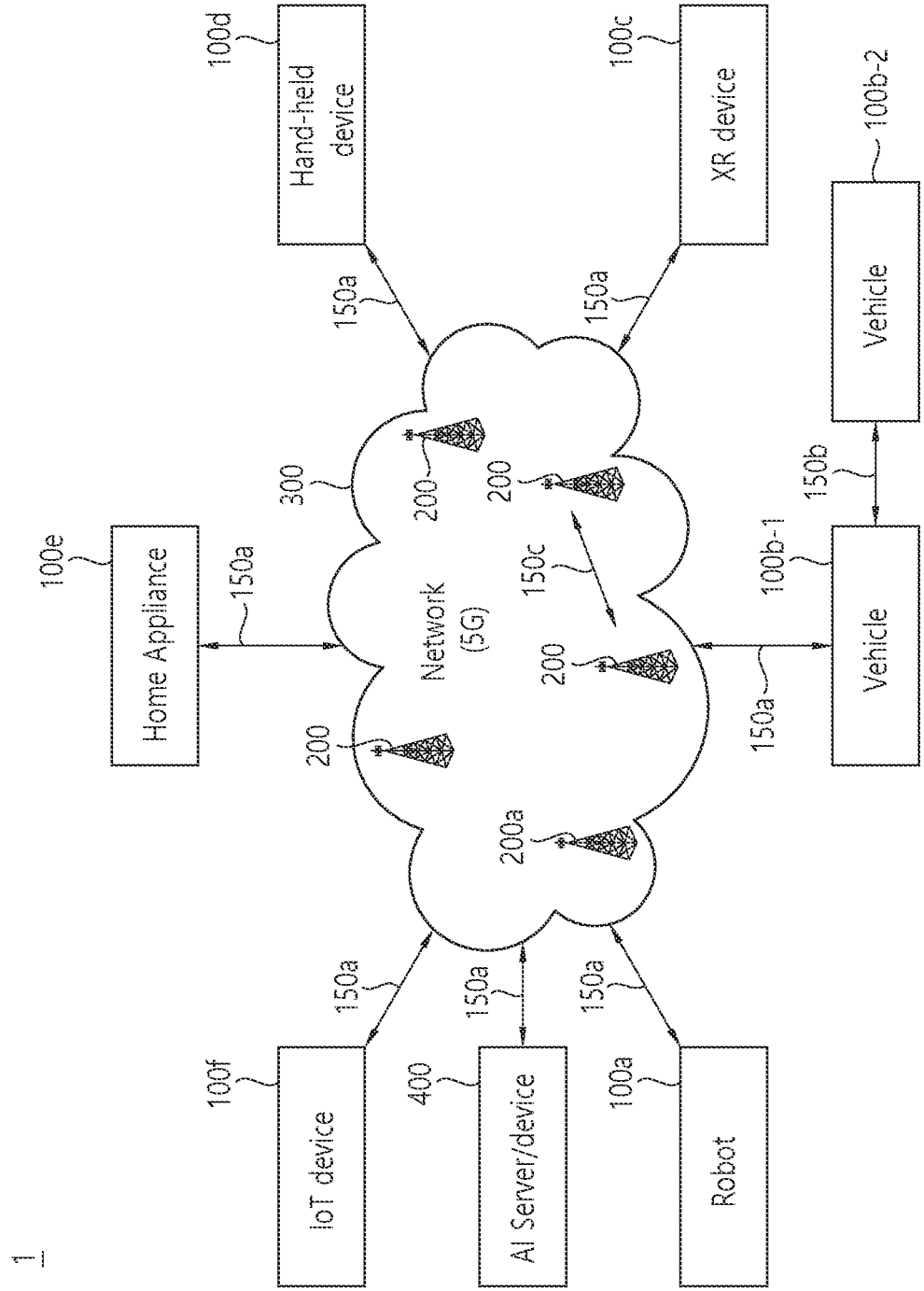
FIG. 18 shows a communication system 1, based on an embodiment of the present disclosure.

FIG. 18 shows a communication system 1, based on an embodiment of the present disclosure.

Referring to FIG. 18, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Herein, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g., relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
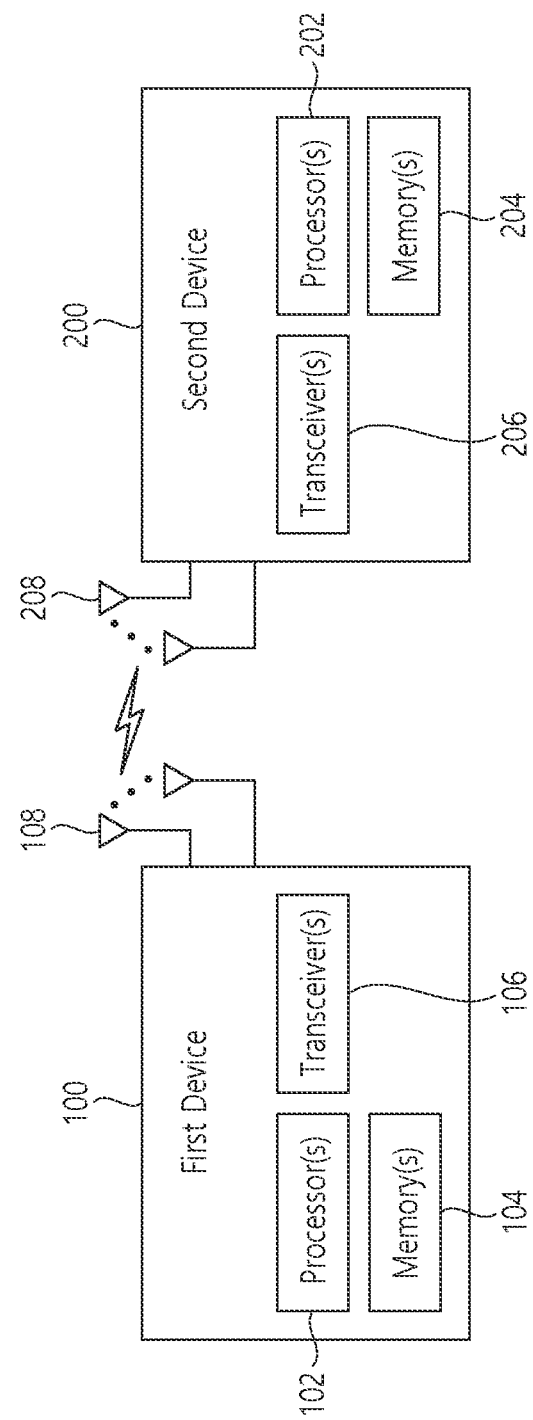
FIG. 19 shows wireless devices, based on an embodiment of the present disclosure.

FIG. 19 shows wireless devices, based on an embodiment of the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs. SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
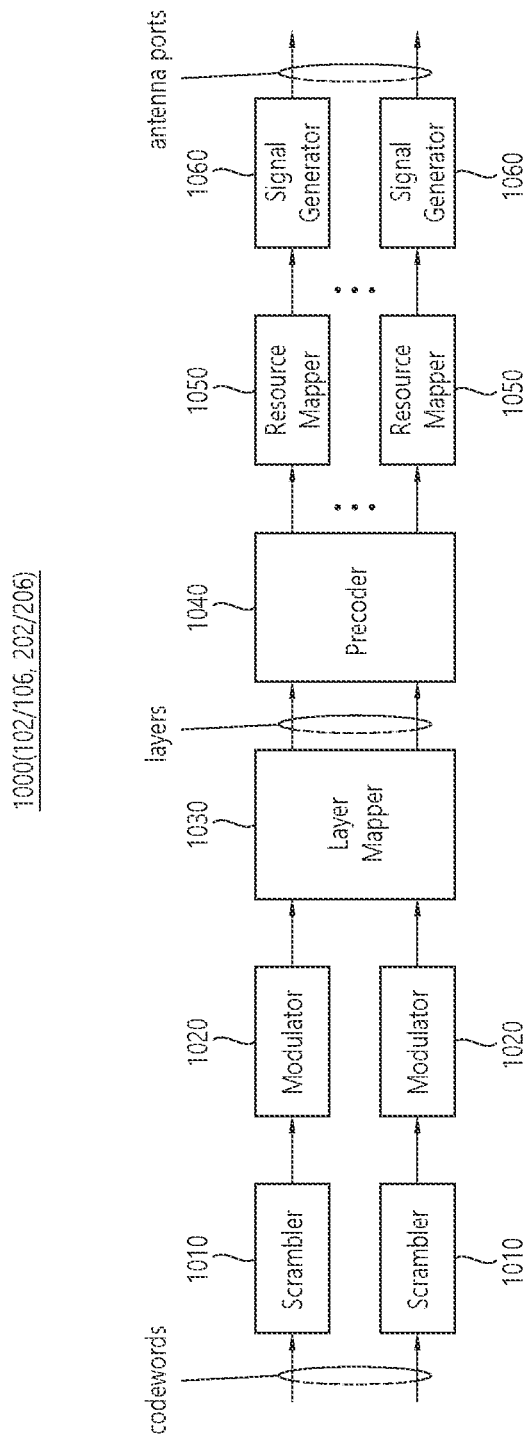
FIG. 20 shows a signal process circuit for a transmission signal, based on an embodiment of the present disclosure.

FIG. 20 shows a signal process circuit for a transmission signal, based on an embodiment of the present disclosure.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 20. For example, the wireless devices (e.g., 100 and 200 of FIG. 19) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 21:
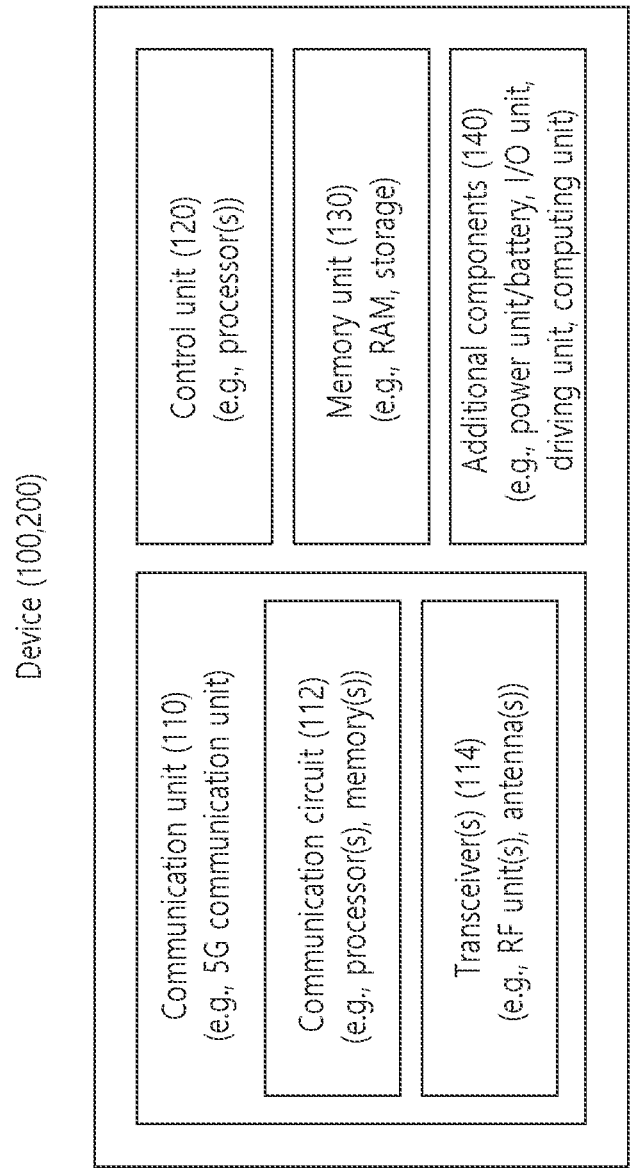
FIG. 21 shows another example of a wireless device, based on an embodiment of the present disclosure.

FIG. 21 shows another example of a wireless device, based on an embodiment of the present disclosure. The wireless device may be implemented in various forms according to a use-case/service (refer to FIG. 18).

Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/ device (400 of FIG. 18), the BSs (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

Figure 22:
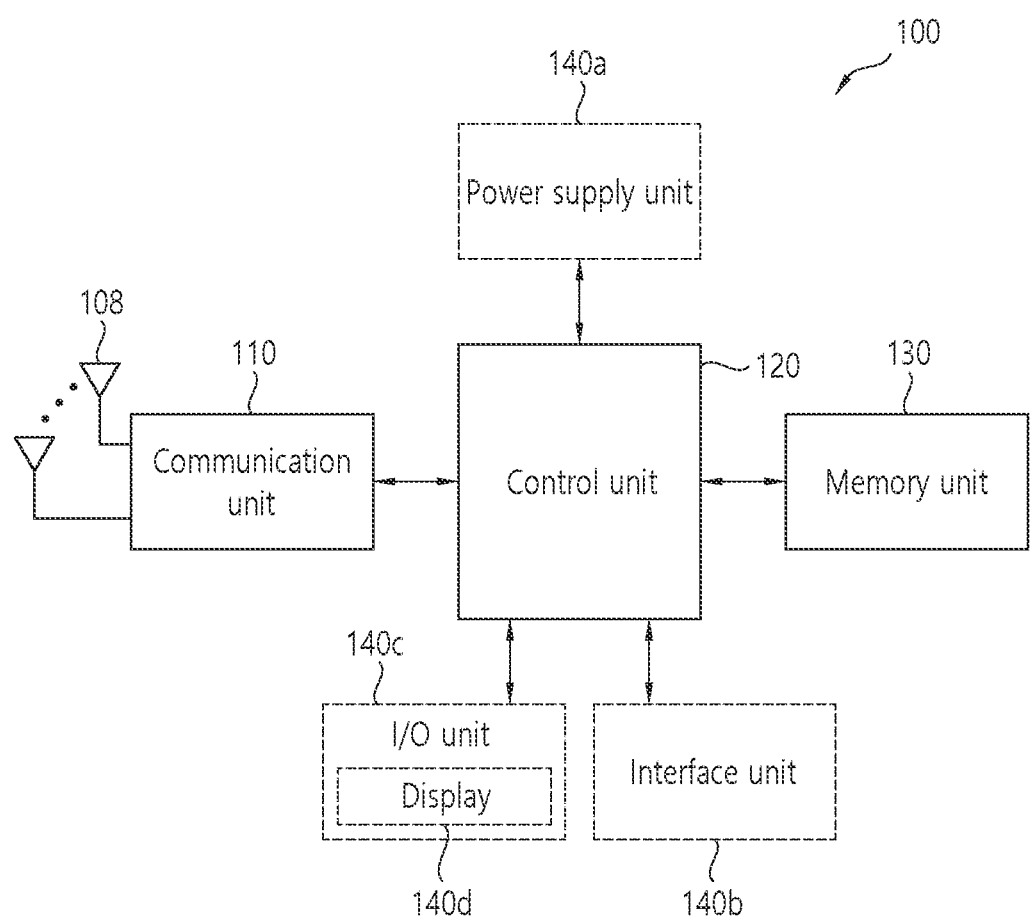
FIG. 22 shows a hand-held device, based on an embodiment of the present disclosure.

FIG. 22 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 22, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/ signals stored in the memory into radio signals and transmit the converted radio signals to other wireless devices directly or to a BS. The communication unit 110 may receive radio signals from other wireless devices or the BS and then restore the received radio signals into original information/ signals. The restored information/signals may be stored in the memory unit 130 and may be output as various types (e.g., text, voice, images, video, or haptic) through the I/O unit 140c.

Figure 23:
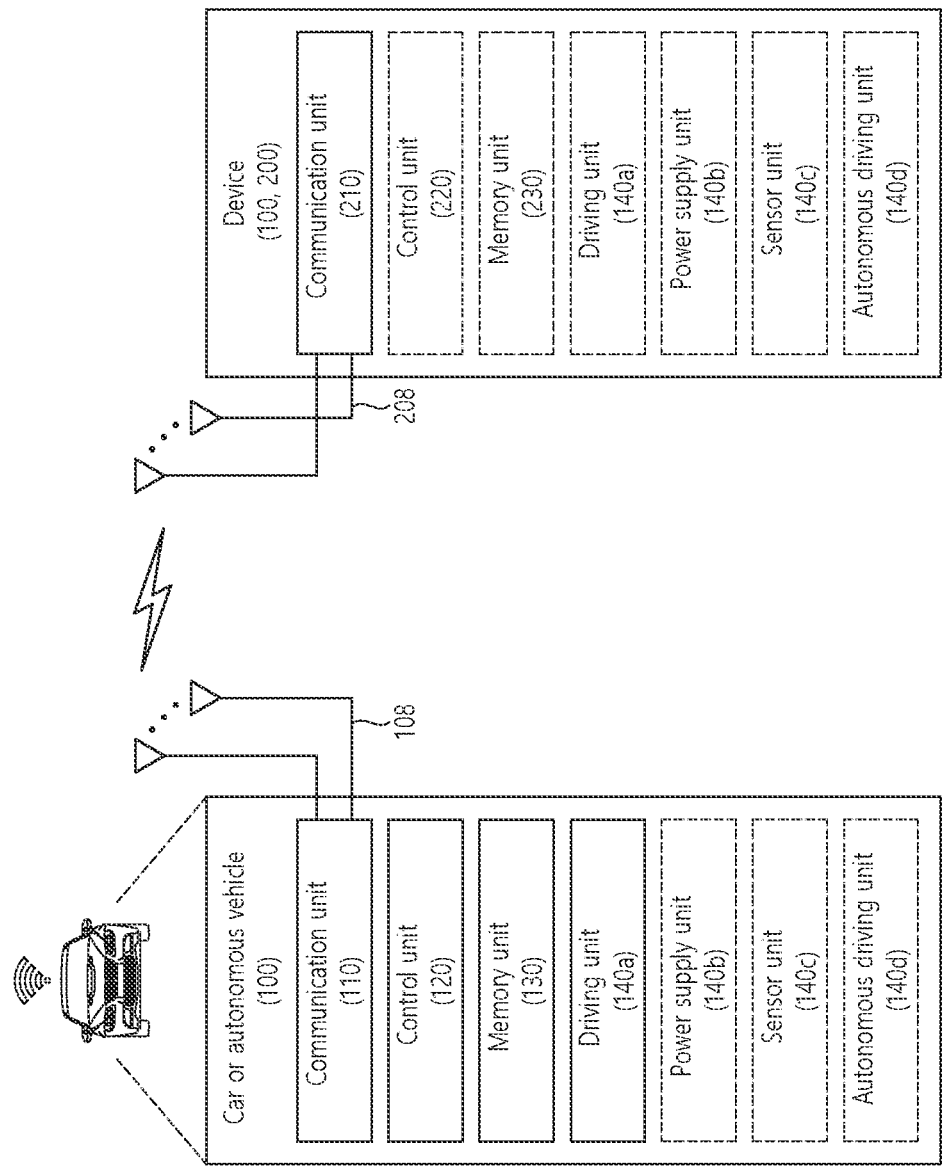
FIG. 23 shows a vehicle or an autonomous vehicle, based on an embodiment of the present disclosure.

FIG. 23 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 23, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (EC U). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The scope of the disclosure may be represented by the following claims, and it should be construed that all changes or modifications derived from the meaning and scope of the claims and their equivalents may be included in the scope of the disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a first device, the method comprising:
    transmitting, to a second device, first sidelink control information for scheduling of physical sidelink shared channel and second sidelink control information on physical sidelink control channel;
    transmitting, to the second device, the second sidelink control information and data;
    determining a physical sidelink feedback channel (PSFCH) resource for receiving a physical sidelink feedback channel from the second device, based on an index of a slot and an index of a subchannel related to the physical sidelink shared channel;
    starting a first timer related to a minimum duration before a sidelink retransmission grant is expected by the first device, based on a failure to monitor the physical sidelink feedback channel in the physical sidelink feedback channel resource and based on that a physical uplink control channel resource is not configured;
    starting a second timer related to a maximum duration until the sidelink retransmission grant is received, based on an expiration of the first timer; and
    retransmitting, to the second device, the data, based on the sidelink retransmission grant,
    wherein the sidelink retransmission grant is received from a base station after the second timer is started, and
    wherein the second timer is stopped after the data is retransmitted to the second device.

2. The method of claim 1,
    wherein monitoring for the physical sidelink feedback channel fails due to transmission of the first device performed in a time domain overlapping the physical sidelink feedback channel resource.

3. The method of claim 1,
    wherein, based on that a number of occurrences of sidelink hybrid automatic repeat request discontinuous transmission reaches a maximum threshold by failing to receive sidelink hybrid automatic repeat request feedback from the second device through the physical sidelink feedback channel resource, the first timer is not started or is stopped.

4. The method of claim 1,
wherein, based on that a number of hybrid automatic repeat request negative acknowledgment receptions reaches a maximum threshold by receiving hybrid automatic repeat request negative acknowledgment representing that the physical sidelink shared channel is not decoded by the second device through the physical sidelink feedback channel resource from the second device, the first timer is not started or is stopped.

5. The method of claim 1,
wherein, based on that a difference between a maximum available transmission number and a current transmission number of a transport block for the physical sidelink feedback channel is less than or equal to a threshold by transmitting the physical sidelink feedback channel to the second device, and based on that the physical uplink control channel resource is not configured, the first timer is not started or is stopped.

6. The method of claim 1, wherein, based on a mode for sidelink communication of the first device being switched from a mode 1 in which sidelink communication is performed based on resource configuration information received from the base station to a mode 2 in which sidelink communication is performed based on sensing of the first device performed in a resource pool, the first timer is not started or is stopped.

7. The method of claim 1,
wherein an expiration time of the first timer is earlier than an earliest time when the sidelink retransmission grant is expected to be received from the base station.

8. The method of claim 1,
wherein the sidelink retransmission grant is transmitted from the base station to the first device through a physical downlink control channel, and
wherein physical downlink control channel monitoring for receiving the physical downlink control channel from the base station is not performed for a time during which the first timer is running.

9. The method of claim 8,
wherein the physical downlink control channel monitoring for receiving the physical downlink control channel from the base station is performed for a time during which the second timer is running.

10. The method of claim 9,
wherein the first device is in a discontinuous reception active state, which is allowed to receive a signal from the base station, in the time during which the second timer is running.

11. A first device, comprising:
at least one transceiver;
at least one processor; and
at least one memory connected to the at least one processor and storing instructions that, based on being executed by the at least one processor, cause the first device to perform operations comprising:
transmitting, to a second device, first sidelink control information for scheduling of physical sidelink shared channel and second sidelink control information on physical sidelink control channel;
transmitting, to the second device, the second sidelink control information and data;
determining a physical sidelink feedback channel resource for receiving a physical sidelink feedback channel from the second device, based on an index of a slot and an index of a subchannel related to the physical sidelink shared channel;
starting a first timer related to a minimum duration before a sidelink retransmission grant is expected by the first device, based on a failure to monitor the physical sidelink feedback channel in the physical sidelink feedback channel resource and based on that a physical uplink control channel resource is not configured;
starting a second timer related to a maximum duration until the sidelink retransmission grant is received, based on an expiration of the first timer; and
retransmitting, to the second device, the data, based on the sidelink retransmission grant,
wherein the sidelink retransmission grant is received from a base station after the second timer is started, and
wherein the second timer is stopped after the data is retransmitted to the second device.

12. The first device of claim 11,
wherein monitoring for the physical sidelink feedback channel fails due to transmission of the first device performed in a time domain overlapping the physical sidelink feedback channel resource.

13. The first device of claim 11,
wherein, based on that a number of occurrences of sidelink hybrid automatic repeat request discontinuous transmission reaches a maximum threshold by failing to receive sidelink hybrid automatic repeat request feedback from the second device through the physical sidelink feedback channel resource, the first timer is not started or is stopped.

14. The first device of claim 11,
wherein, based on that a number of hybrid automatic repeat request negative acknowledgment receptions reaches a maximum threshold by receiving hybrid automatic repeat request negative acknowledgment representing that the physical sidelink shared channel is not decoded by the second device through the physical sidelink feedback channel resource from the second device, the first timer is not started or is stopped.

15. A processing device adapted to control a first device, the processing device comprising:
at least one processor; and
at least one memory connected to the at least one processor and storing instructions that, based on being executed by the at least one processor, cause the first device to perform operations comprising:
transmitting, to a second device, first sidelink control information for scheduling of physical sidelink shared channel and second sidelink control information on physical sidelink control channel;
transmitting, to the second device, the second sidelink control information and data;
determining a physical sidelink feedback channel resource for receiving a physical sidelink feedback channel from the second device, based on an index of a slot and an index of a subchannel related to the physical sidelink shared channel;
starting a first timer related to a minimum duration before a sidelink retransmission grant is expected by the first device, based on a failure to monitor the physical sidelink feedback channel in the physical sidelink feedback channel resource and based on that a physical uplink control channel resource is not configured;
starting a second timer related to a maximum duration until the sidelink retransmission grant is received, based on an expiration of the first timer; and
retransmitting, to the second device, the data, based on the sidelink retransmission grant, wherein the sidelink retransmission grant is received from a base station after the second timer is started, and wherein the second timer is stopped after the data is retransmitted to the second device.

16. The processing device of claim 15, wherein monitoring for the physical sidelink feedback channel fails due to transmission of the first device performed in a time domain overlapping the physical sidelink feedback channel resource.

17. The processing device of claim 15, wherein, based on that a number of occurrences of sidelink hybrid automatic repeat request discontinuous transmission reaches a maximum threshold by failing to receive sidelink hybrid automatic repeat request feedback from the second device through the physical sidelink feedback channel resource, the first timer is not started or is stopped.

18. The processing device of claim 15, wherein, based on that a number of hybrid automatic repeat request negative acknowledgment receptions reaches a maximum threshold by receiving hybrid automatic repeat request negative acknowledgment representing that the physical sidelink shared channel is not decoded by the second device through the physical sidelink feedback channel resource from the second device, the first timer is not started or is stopped.

* * * * *